United States Patent
Hase

(10) Patent No.: US 12,047,544 B2
(45) Date of Patent: Jul. 23, 2024

(54) MOIRÉ OCCURRENCE PREDICTION DEVICE, MOIRÉ OCCURRENCE PREDICTION SYSTEM, AND MOIRÉ OCCURRENCE PREDICTION METHOD

(71) Applicant: TOPPAN INC., Tokyo (JP)

(72) Inventor: Yota Hase, Tokyo (JP)

(73) Assignee: TOPPAN INC., Tokyo (JP)

( * ) Notice: Subject to any disclaimer, the term of this patent is extended or adjusted under 35 U.S.C. 154(b) by 0 days.

(21) Appl. No.: 18/099,256

(22) Filed: Jan. 19, 2023

(65) Prior Publication Data
US 2023/0164283 A1  May 25, 2023

Related U.S. Application Data

(63) Continuation of application No. PCT/JP2021/022607, filed on Jun. 15, 2021.

(30) Foreign Application Priority Data
Jul. 22, 2020 (JP) .................................. 2020-124988

(51) Int. Cl.
H04N 1/40 (2006.01)
H04N 1/405 (2006.01)
H04N 1/409 (2006.01)

(52) U.S. Cl.
CPC ......... H04N 1/409 (2013.01); H04N 1/40068 (2013.01); H04N 1/405 (2013.01)

(58) Field of Classification Search
CPC . H04N 1/52; H04N 1/409; H04N 1/405–4058
See application file for complete search history.

(56) References Cited

U.S. PATENT DOCUMENTS 8,174,552 B2 * 5/2012 Swanson ............. H04N 1/3876
347/224
8,699,066 B2 * 4/2014 Yanai .................. H04N 1/4055
358/1.9
(Continued)

FOREIGN PATENT DOCUMENTS

CN    111383186 A    7/2020
JP    2006-254095 A   9/2006
(Continued)

OTHER PUBLICATIONS

International Searching Authority, "International Search Report," issued in connection with International Patent Application No. PCT/JP2021/022607, dated Aug. 17, 2021.
(Continued)

*Primary Examiner* — Barbara D Reinier
(74) *Attorney, Agent, or Firm* — Foley & Lardner LLP

(57) ABSTRACT

A moiré occurrence prediction means that predicts a region in which moiré will occur and implements a moiré suppression process only on a pattern including said region, thereby minimizing print deterioration, suppressing the occurrence of moiré, and enabling high quality printing. The moiré occurrence prediction means includes a communication unit for receiving an input image; a periodic structure inclusion determination unit for determining, in the input image; a periodic structure region that includes a periodic structure that induces occurrence of a moiré; and a moiré prediction unit for determining a risk of moiré occurrence in each periodic structure region by performing a predetermined frequency analysis process with respect to each of the determined periodic structure regions, generating a moiré occurrence notification that indicates the risk for each periodic structure region, and outputting the moiré occurrence notification.

11 Claims, 14 Drawing Sheets

(56) References Cited

U.S. PATENT DOCUMENTS

2005/0254096 A1* 11/2005 Fischer .................. H04N 1/405
382/280
2020/0004481 A1 1/2020 Tsuda et al.

FOREIGN PATENT DOCUMENTS

| JP | 2007-129558 A | 5/2007 |
| JP | 2010-010881 A | 1/2010 |
| JP | 2011-155362 A | 8/2011 |
| JP | 2015-023378 A | 2/2015 |

OTHER PUBLICATIONS

International Searching Authority, "Written Opinion," issued in connection with International Patent Application No. PCT/JP2021/022607, dated Aug. 17, 2021.
European Extended Search Report, dated Oct. 5, 2023, issued in corresponding European Patent Application No. 21846149.9.

* cited by examiner

FIG. 10
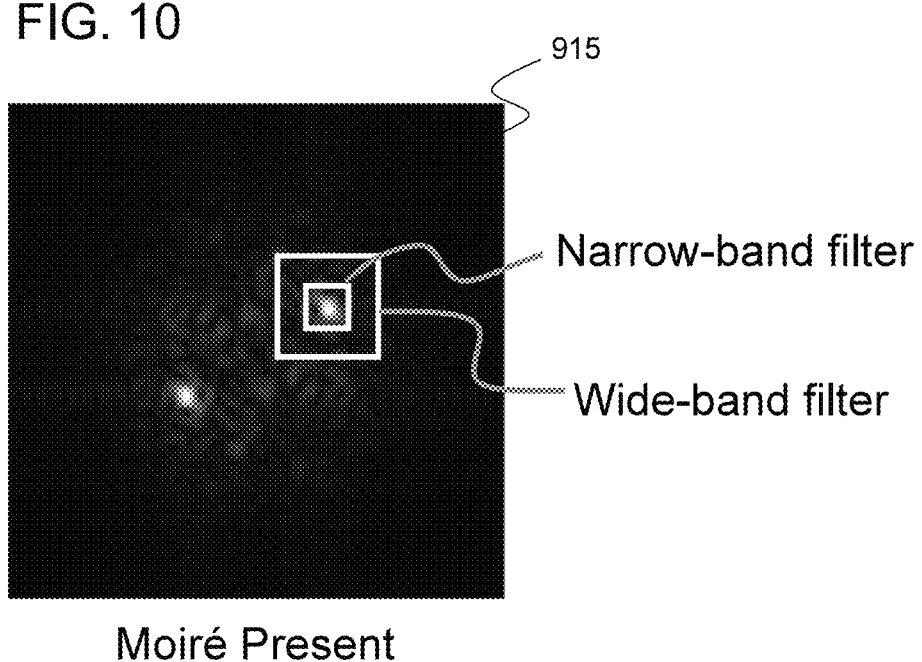
Moiré Present
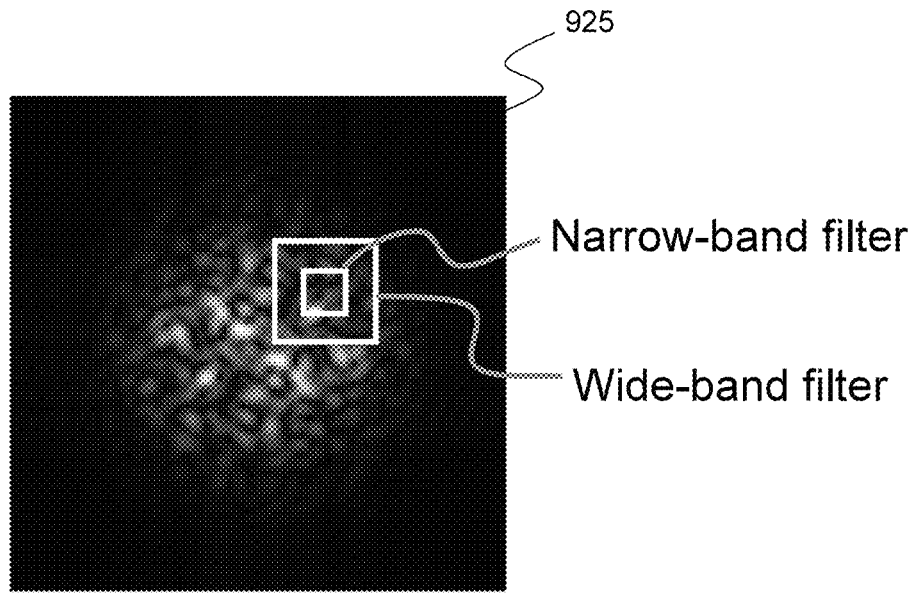
Moiré Absent

FIG. 11
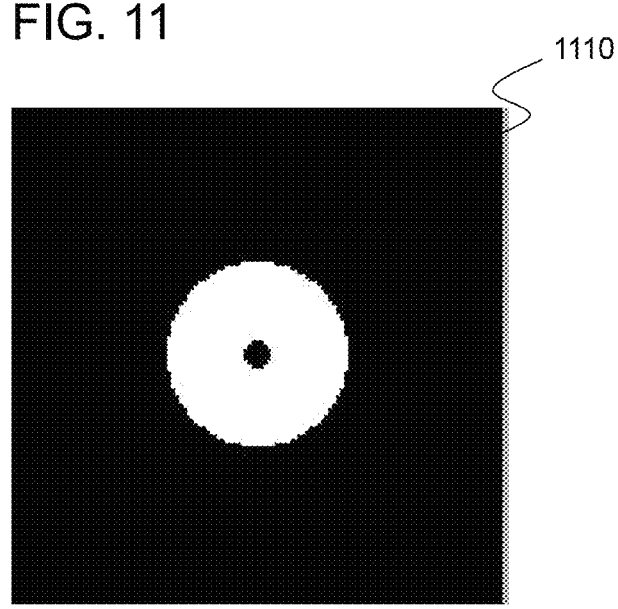
Low Frequency Mask
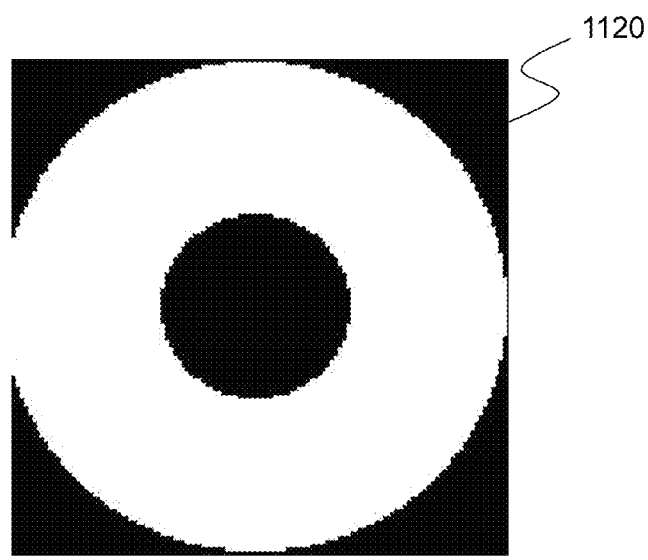
High Frequency Mask

FIG. 13    1300
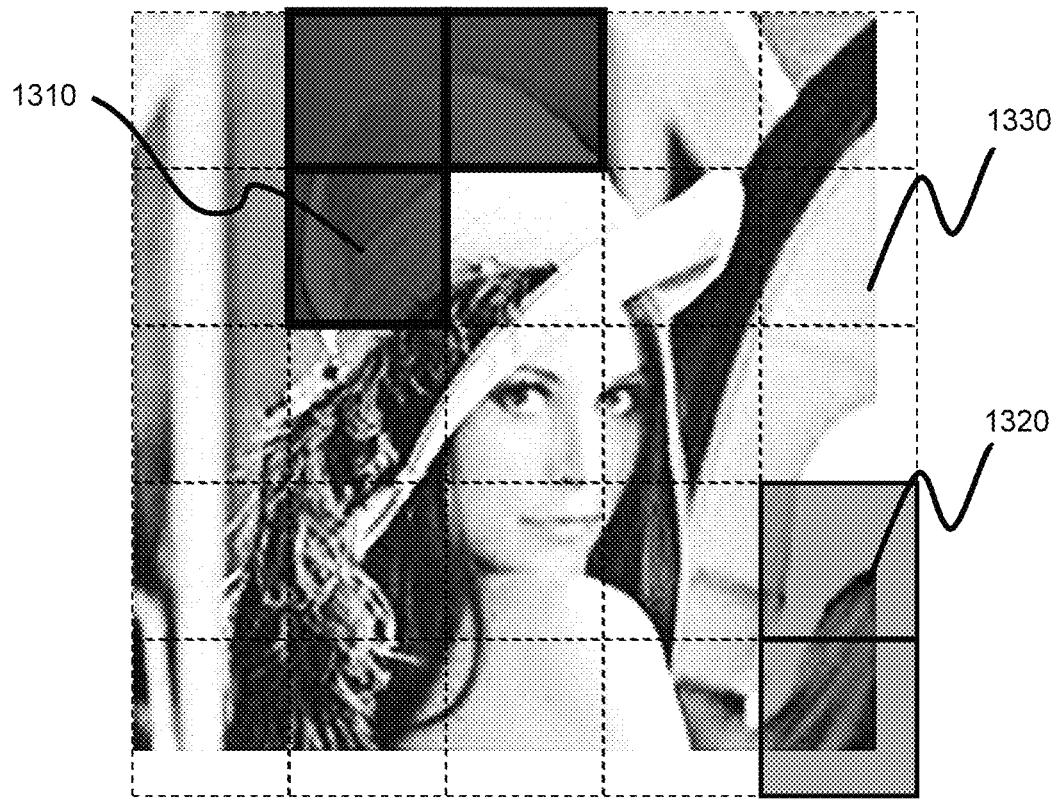

MOIRÉ OCCURRENCE PREDICTION DEVICE, MOIRÉ OCCURRENCE PREDICTION SYSTEM, AND MOIRÉ OCCURRENCE PREDICTION METHOD

CROSS-REFERENCE TO RELATED APPLICATIONS

This is a bypass continuation of PCT Application No. PCT/JP2021/022607, filed on Jun. 15, 2021, which claims priority to Japanese Application No. 2020-124988, filed on Jul. 22, 2020. The contents of these applications are hereby incorporated by reference in their entireties.

TECHNICAL FIELD

The embodiments of the present disclosure generally relate to a moiré occurrence prediction device, a moiré occurrence prediction system, and a moiré occurrence prediction method.

BACKGROUND OF THE INVENTION

"Moiré (or moiré)" is an interference fringe that visually occurs when a plurality of periodic patterns or structures are superimposed. Moreover, in physics, moiré can be said to be a beat phenomenon of two spatial frequencies.

Although moiré can be leveraged for useful purposes, when an unintended moiré occurs, the design of images may be impaired, which may lead to deterioration of the quality of printed materials. Accordingly, means for removing undesirable moiré have been proposed.

For example, Patent Document 1 discloses a technique in which "a first halftone processing means for generating first halftone image data from image data input using a threshold value, a first filter processing means for smoothing the first halftone image data using a first filter having a size corresponding to a period of the threshold value, a second filter processing means for smoothing the input image data using a second filter having a characteristic corresponding to the first filter, and an evaluation means for evaluating moiré generated in the first halftone image data based on a difference between the first halftone image data smoothed by the first filter processing means and the image data smoothed by the second filter processing means" are used as means for removing moiré.

CITATION LIST

Patent Literature

[Patent Document 1] Japanese Unexamined Patent Application Publication No. 2011-155362 A

SUMMARY OF INVENTION

Technical Problem

Patent Literature 1 discloses a method of detecting moiré by taking the difference between two smoothing filters having different degrees, and performing a moiré removal process.

However, in the method described in Patent Literature 1, since all of the regions where the difference between the smoothing filters is large are converted from an AM screen to an FM screen, the regions of the image where no moiré occurs are processed together with the regions where moiré does occur. However, when a moiré removal process is performed on regions of an image where no moiré has occurred, the texture of the object in the image may be impaired, the sharpness of the image may be decreased, and the printing quality may be deteriorated. For this reason, when the means described in Patent Document 1 is applied, since the moiré removal processing is also performed on regions of the image where no moiré has occurred, in addition to the processing load increasing, deterioration due to excessive performing of moiré prevention processing occurs.

Accordingly, it is desirable to have a means for predicting in advance those regions in which moiré will occur, and for performing moiré suppression processing only on the predicted regions.

Accordingly, an object of the embodiments of the present disclosure is to provide a moiré occurrence prediction means that predicts a region in which moiré will occur and implements a moiré suppression process only on a pattern including said region, thereby mitigating print deterioration, suppressing the occurrence of moiré, and enabling high quality printing.

Solution to Problem

In order to solve the above problem, one representative moiré occurrence prediction system according to the present disclosure is a moiré occurrence prediction system including a client terminal and a moiré occurrence prediction device connected via a communication network, wherein the moiré occurrence prediction device includes: a communication unit for receiving an input image; a periodic structure inclusion determination unit for determining, in the input image; a periodic structure region that includes a periodic structure that induces occurrence of a moiré; and a moiré prediction unit for determining a degree of risk of moiré occurrence in each periodic structure region by performing a predetermined frequency analysis process with respect to each of the determined periodic structure regions, generating a moiré occurrence notification that indicates the degree of risk for each periodic structure region, and transmitting the moiré occurrence notification to the client terminal.

Advantageous Effects of Invention

According to the present disclosure, it is possible to provide a moiré occurrence prediction means that predicts a region in which moiré will occur and implements a moiré suppression process only on a pattern including said region, thereby mitigating print deterioration, suppressing the occurrence of moiré, and enabling high quality printing.

BRIEF DESCRIPTION OF DRAWINGS

FIG. 10 is a diagram illustrating an example of a case where a moiré is determined using a threshold value after frequency analysis is performed on a difference extraction image according to the embodiments of the present disclosure.

FIG. 11 is a diagram illustrating an example of masks used in the frequency analysis process according to the embodiments of the present disclosure.

FIG. 13 is a diagram illustrating an example of a moiré occurrence notification according to the embodiments of the present disclosure.

DESCRIPTION OF EMBODIMENT(S)

Figure 1:
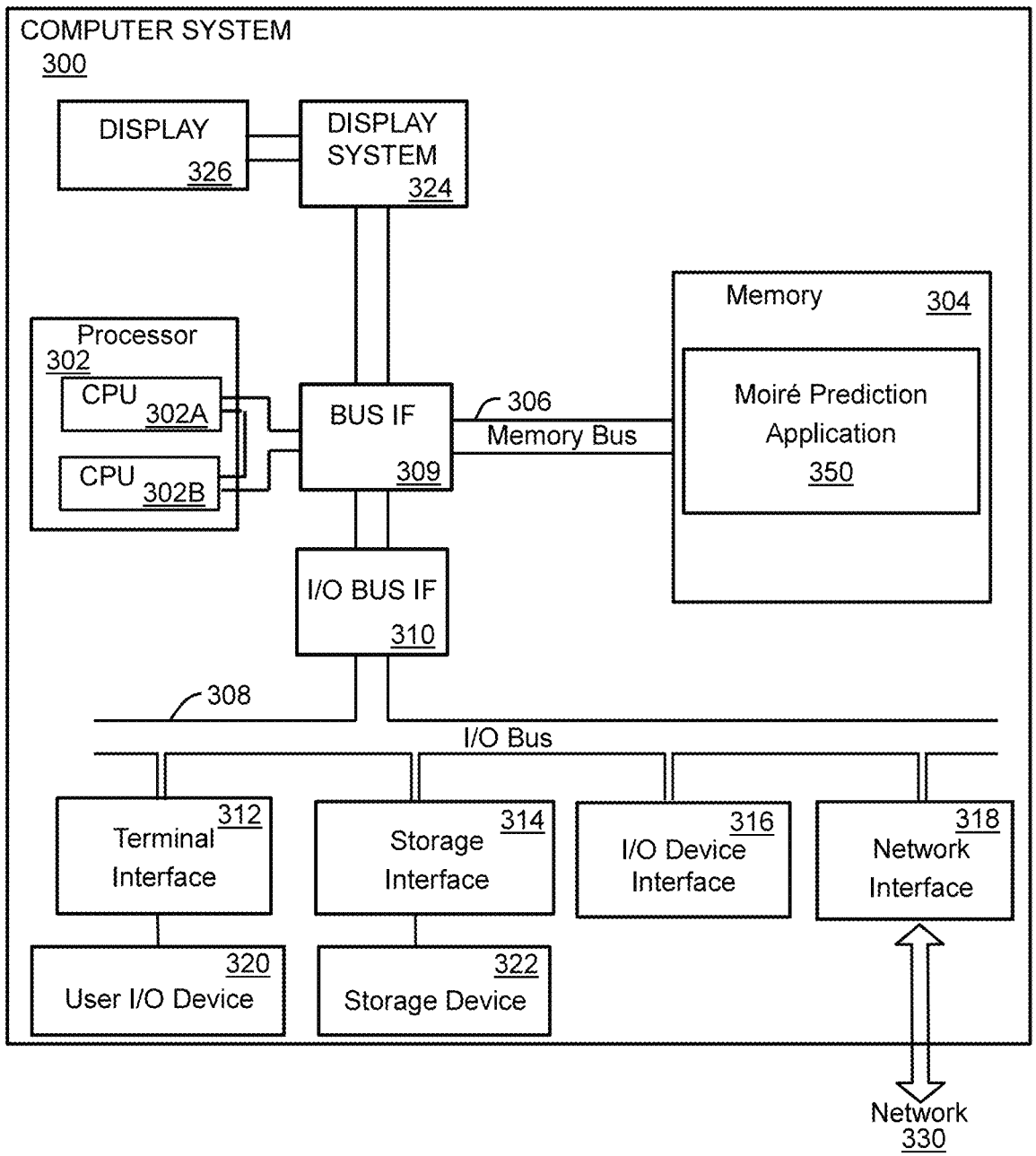
FIG. 1 is a diagram illustrating a computer system for carrying out the embodiments of the present disclosure.

Hereinafter, embodiments of the present disclosure will be described with reference to the drawings. It should be noted that the present invention is not limited by these embodiments. In addition, in the description of the drawings, the same components are denoted by the same reference numerals.

BACKGROUND AND SUMMARY OF THE DISCLOSURE

As described above, in the case that a periodic pattern such as a stripe pattern or a mesh pattern exists in an image to be printed, when the image is converted into a halftone dot image for printing and the pattern is represented by halftone dots, the period of the pattern and the period of the halftone dots interfere with each other, and a texture called moiré that does not exist in the original image may appear. In particular, when a moiré having a large period occurs and is viewed, the viewer may feel discomfort, which can cause a deterioration in quality.

For example, in the case of catalog printing in which the required characteristics of the print quality are strict, when moiré occurs, many pages of the catalog must be reprinted, resulting in a large loss.

Also, in the case of comic printing, if an area using a screen tone is present, moiré is likely to occur in the screen tone area, which may cause a large amount of printing loss.

Conventionally, with regard to such moiré, visual inspection of the image and correction of the moiré were performed manually, but inspection and correction of many images and pages requires the effort of workers, leading to a large workload.

On the other hand, in order to prevent moiré, for example, a method of removing the high-frequency components of an original image in advance is common, but in the case of catalogs, this impairs the texture of clothes, and in the case of comics, the sharpness of the printing is impaired. As a result, the deterioration in printing quality and the high cost of manual operation become problematic.

Accordingly, it is desirable to have a means for predicting in advance those regions in which moiré will occur, and for performing moiré suppression processing only on the predicted regions.

Accordingly, as described above, according to the present disclosure, it is possible to provide a moiré occurrence prediction means that predicts a region in which moiré will occur and implements a moiré suppression process only on a pattern including said region, thereby mitigating print deterioration, suppressing the occurrence of moiré, and enabling high quality printing.

(Hardware Configuration)

Referring first to FIG. 1, a computer system 300 for implementing the embodiments of the present disclosure will be described. The mechanisms and devices of the various embodiments disclosed herein may be applied to any suitable computing system. The main components of the computer system 300 include one or more processors 302, a memory 304, a terminal interface 312, a storage interface 314, an I/O (Input/Output) device interface 316, and a network interface 318. These components may be interconnected via a memory bus 306, an I/O bus 308, a bus interface unit 309, and an I/O bus interface unit 310.

The computer system 300 may include one or more general purpose programmable central processing units (CPUs), 302A and 302B, herein collectively referred to as the processor 302. In some embodiments, the computer system 300 may contain multiple processors, and in other embodiments, the computer system 300 may be a single CPU system. Each processor 302 executes instructions stored in the memory 304 and may include an on-board cache.

In some embodiments, the memory 304 may include a random access semiconductor memory, storage device, or storage medium (either volatile or non-volatile) for storing data and programs. The memory 304 may store all or a part of the programs, modules, and data structures that perform the functions described herein. For example, the memory 304 may store a moiré prediction application 350. In some embodiments, the moiré prediction application 350 may include instructions or statements that execute the functions described below on the processor 302.

In some embodiments, the moiré prediction application 350 may be implemented in hardware via semiconductor devices, chips, logic gates, circuits, circuit cards, and/or other physical hardware devices in lieu of, or in addition to processor-based systems. In some embodiments, the moiré prediction application 350 may include data other than instructions or statements. In some embodiments, a camera, sensor, or other data input device (not shown) may be provided to communicate directly with the bus interface unit 309, the processor 302, or other hardware of the computer system 300.

The computer system 300 may include a bus interface unit 309 for communicating between the processor 302, the memory 304, a display system 324, and the I/O bus interface unit 310. The I/O bus interface unit 310 may be coupled with the I/O bus 308 for transferring data to and from the various I/O units. The I/O bus interface unit 310 may communicate with a plurality of I/O interface units 312, 314, 316, and 318, also known as I/O processors (IOPs) or I/O adapters (IOAs), via the I/O bus 308.

The display system 324 may include a display controller, a display memory, or both. The display controller may provide video, audio, or both types of data to the display device 326. Further, the computer system 300 may also include a device, such as one or more sensors, configured to collect data and provide the data to the processor 302.

For example, the computer system 300 may include biometric sensors that collect heart rate data, stress level data, and the like, environmental sensors that collect humidity data, temperature data, pressure data, and the like, and motion sensors that collect acceleration data, movement data, and the like. Other types of sensors may be used. The display system 324 may be connected to a display device 326, such as a single display screen, television, tablet, or portable device.

The I/O interface unit is capable of communicating with a variety of storage and I/O devices. For example, the terminal interface unit 312 supports the attachment of a user I/O device 320, which may include user output devices such as a video display device, a speaker, a television or the like, and user input devices such as a keyboard, mouse, keypad, touchpad, trackball, buttons, light pens, or other pointing devices or the like. A user may use the user interface to operate the user input device to input input data and instructions to the user I/O device 320 and the computer system 300 and receive output data from the computer system 300. The user interface may be presented via the user I/O device 320, such as displayed on a display device, played via a speaker, or printed via a printer.

The storage interface 314 supports the attachment of one or more disk drives or direct access storage devices 322 (which are typically magnetic disk drive storage devices, but may be arrays of disk drives or other storage devices configured to appear as a single disk drive). In some embodiments, the storage device 322 may be implemented as any secondary storage device. The contents of the memory 304 are stored in the storage device 322 and may be read from the storage device 322 as needed. The I/O device interface 316 may provide an interface to other I/O devices such as printers, fax machines, and the like. The network interface 318 may provide a communication path so that computer system 300 and other devices can communicate with each other. The communication path may be, for example, the network 330.

In some embodiments, the computer system 300 may be a multi-user mainframe computer system, a single user system, or a server computer or the like that has no direct user interface and receives requests from other computer systems (clients). In other embodiments, the computer system 300 may be a desktop computer, a portable computer, a notebook computer, a tablet computer, a pocket computer, a telephone, a smart phone, or any other suitable electronic device.

Next, with reference to FIG. 2, a moiré occurrence prediction system according to the embodiments of the present disclosure will be described.

Figure 2:
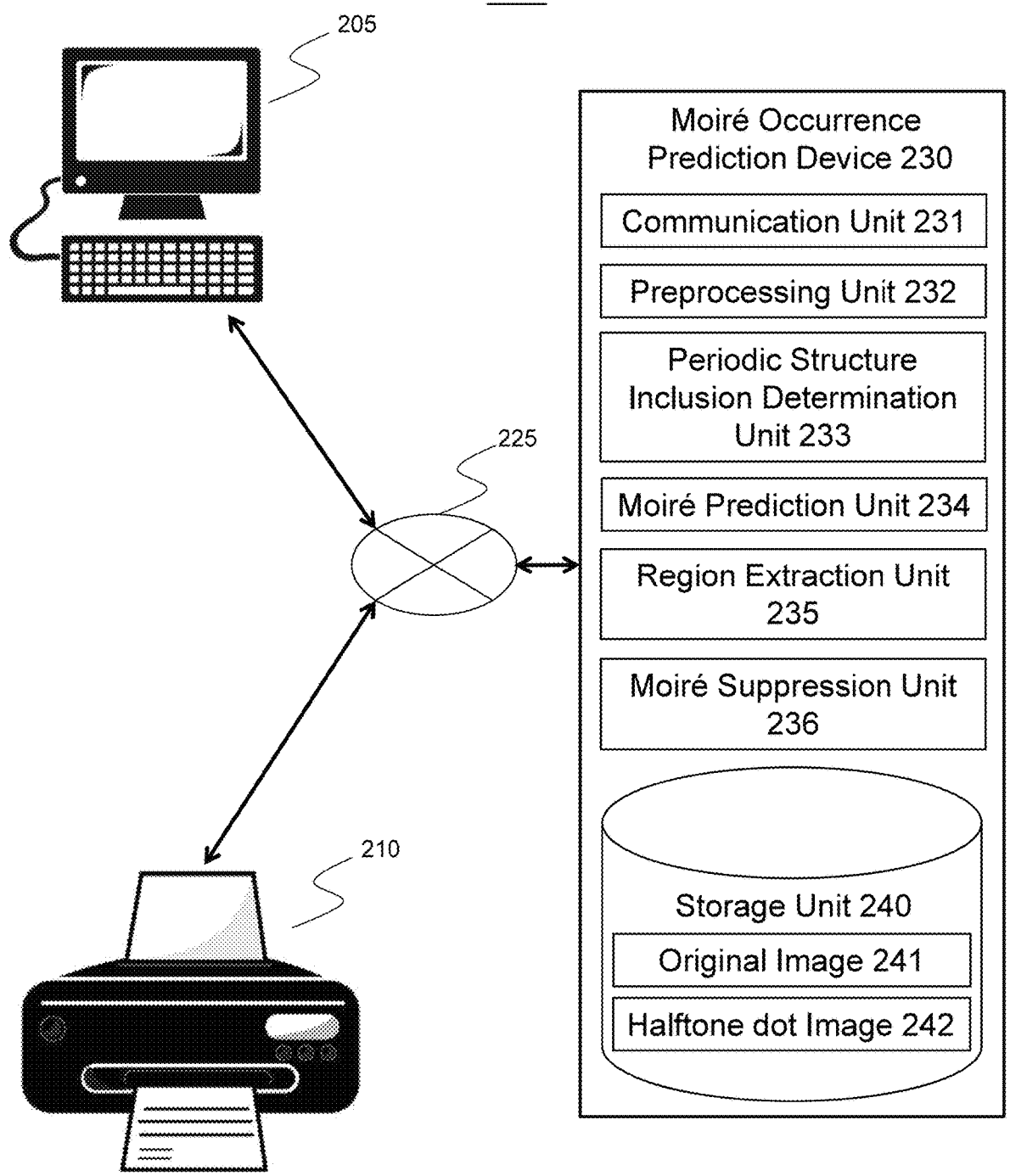
FIG. 2 is a diagram illustrating an example of a configuration of an occurrence prediction system according to the embodiments of the present disclosure.

FIG. 2 is a diagram illustrating an example of a configuration of the occurrence prediction system 200 according to the embodiments of the present disclosure. As illustrated in FIG. 2, the occurrence prediction system 200 includes a client terminal 205, a printing unit 210, and a moiré occurrence prediction device 230. The client terminal 205, the printing unit 210, and the moiré occurrence prediction device 230 are connected to each other via, for example, a communication network 225.

The communication network 225 may be, for example, the Internet or a Local Area Network (LAN).

The client terminal 205 is a terminal that transmits an input image to be subjected to a moiré occurrence prediction process, which will be described later, to the moiré occurrence prediction device via the communication network 225. The client terminal 205 may be a terminal used by an individual or a terminal shared by an organization such as a private company. The client terminal 205 may be any device such as a desktop personal computer, a notebook personal computer, a tablet, or a smartphone.

The user of the client terminal 205 may input an input image, printing conditions for the input image, and the like via, for example, a graphical user interface (GUI) of the client terminal 205. It should be noted that the GUI of the client terminal 205 will be described later (see FIG. 4).

The printing unit 210 is a printing unit for printing the image data generated by the moiré occurrence prediction device 230 after any moiré are suppressed. It should be noted that the printing unit 210 may print an image output from the moiré suppression unit 236 of the moiré occurrence prediction device 230, or may print an image received from the client terminal.

The moiré occurrence prediction device 230 is a device for performing the processing according to the moiré occurrence prediction method according to the embodiments of the present disclosure. As illustrated in FIG. 2, the moiré occurrence prediction device 230 includes a communication unit 231, a preprocessing unit 232, a periodic structure inclusion determination unit 233, a moiré prediction unit 234, a region extraction unit 235, a moiré suppression unit 236, and a storage unit 240. The moiré occurrence prediction device 230 can provide a moiré occurrence prediction means that mitigates printing deterioration, suppresses the occurrence of moiré, and enables high-quality printing by processing an input image received from the client terminal 205, for example, using the functional units described above, thereby predicting a degree of risk of moiré occurrence for each of a plurality of regions that form the input image, and performing moiré suppression only on regions with a high degree of risk, for example.

The communication unit 231 is a functional unit for transmitting and receiving various types of information communicated between the moiré occurrence prediction device 230, the client terminal 205, and the printing unit 210. For example, the communication unit 231 may receive an input image received from the client terminal 205 or transmit an image generated by the moiré prediction unit 234 or the moiré suppression unit 236 to the client terminal 205 or the printing unit 210.

The pre-processing unit 232 is a functional unit for performing pre-processing on an image to be subjected to the moiré occurrence prediction process by the moiré occurrence prediction device. For example, the pre-processing unit 232 may perform optional pre-processing such as performing RIP (Raster Image Processor) processing on an original image in a vector data format received from the client terminal 205, generating a halftone dot image in the raster data format, or dividing the input image into a plurality of processing blocks.

The periodic structure inclusion determination unit 233 is a functional unit for determining, in the original image, a periodic structure region that includes a periodic structure that induces the occurrence of a moiré. As will be described later, the periodic structure inclusion determination unit 233 may, with respect to the original image, perform a color conversion process to convert to a predetermined color space; perform a contour component extraction process for extracting a contour component, perform a smoothing process, normalize a maximum and a minimum value of pixels, and determine, by performing the predetermined frequency analysis process, a periodic structure region that includes a periodic structure that induces occurrence of a moiré based on either a frequency peak, a frequency peak intensity, or an intensity distribution of the original image.

It should be noted that the details of the processing of the periodic structure inclusion determination unit 233 will be described later with reference to FIG. 6.

The moiré prediction unit 234 is a functional unit for determining a degree of risk of moiré occurrence in each periodic structure region by performing a predetermined frequency analysis process with respect to each of the periodic structure regions determined by the periodic structure inclusion determination unit 233, generating a moiré occurrence notification that indicates the degree of risk for each periodic structure region, and outputting the moiré occurrence notification. More particularly, the moiré prediction unit 234 may, with respect to the original image, perform a color conversion process to convert to a predetermined color space, perform a contour component extraction process for extracting a contour component, and perform a smoothing process, and may, with respect to the halftone dot image, perform a color conversion process to convert to a predetermined color space, perform a resolution conversion process for aligning to a resolution of the original image, perform a smoothing process, subsequently generate a difference extraction image that indicates a pixel difference between the original image and the halftone dot image, determine, by performing the predetermined frequency analysis process with respect to the difference extraction image, a degree of risk of moiré occurrence based on either a frequency peak, a frequency peak intensity, or an intensity distribution of the difference extraction image, and generate a moiré occurrence notification that indicates the degree of risk for each processing block.

In an embodiment, the moiré occurrence notification may be transmitted to the client terminal 205, and in other embodiments, the region extraction unit 235 and the moiré suppression unit 236 described later may perform a moiré suppression process based on the moiré occurrence notification.

The details of the processing of the moiré prediction unit 234 will be described later with reference to FIG. 8.

The region extraction unit 235 is a functional unit that, with respect to the original image, performs a color conversion process for converting to a predetermined color space and generates an element similarity map that indicates similar regions having similar pixel values.

It should be noted that the details of the processing of the region extraction unit 235 will be described later with reference to FIG. 12.

The moiré suppression unit 236 is a functional unit for performing a predetermined moiré suppression process for each similar region in the halftone dot image. As the moiré suppression process performed by the moiré suppression unit 236, a means for adjusting the size of the tone so that the individual tone densities of the halftone dot image match the original image densities at the same positions, or a means of converting the tone shape of a halftone dot image to a clean tone can be considered, but the moiré suppression unit 236 according to the embodiments of the present disclosure is not limited hereto, and may perform any moiré suppression processing.

The storage unit 240 is a storage region for storing various types of information used by the above-described functional units. For example, as illustrated in FIG. 2, the storage unit 240 may store a source image 241 in a vector data format and a halftone dot image 242 in a raster data format that is generated by performing a Raster Image Process (RIP) process on the source image received from the client terminal 205. The storage unit 240 may be, for example, a storage device such as a hard disk drive or a solid state drive, or may be a cloud-type storage area.

According to the moiré occurrence prediction device 230 configured as described above, it is possible to provide a moiré occurrence prediction means that predicts a region in which moiré will occur and implements a moiré suppression process only on a pattern including said region, thereby mitigating print deterioration, suppressing the occurrence of moiré, and enabling high quality printing.

Next, with reference to FIG. 3, the overall flow of a printing process including the moiré occurrence prediction process according to the embodiments of the present disclosure will be described.

Figure 3:
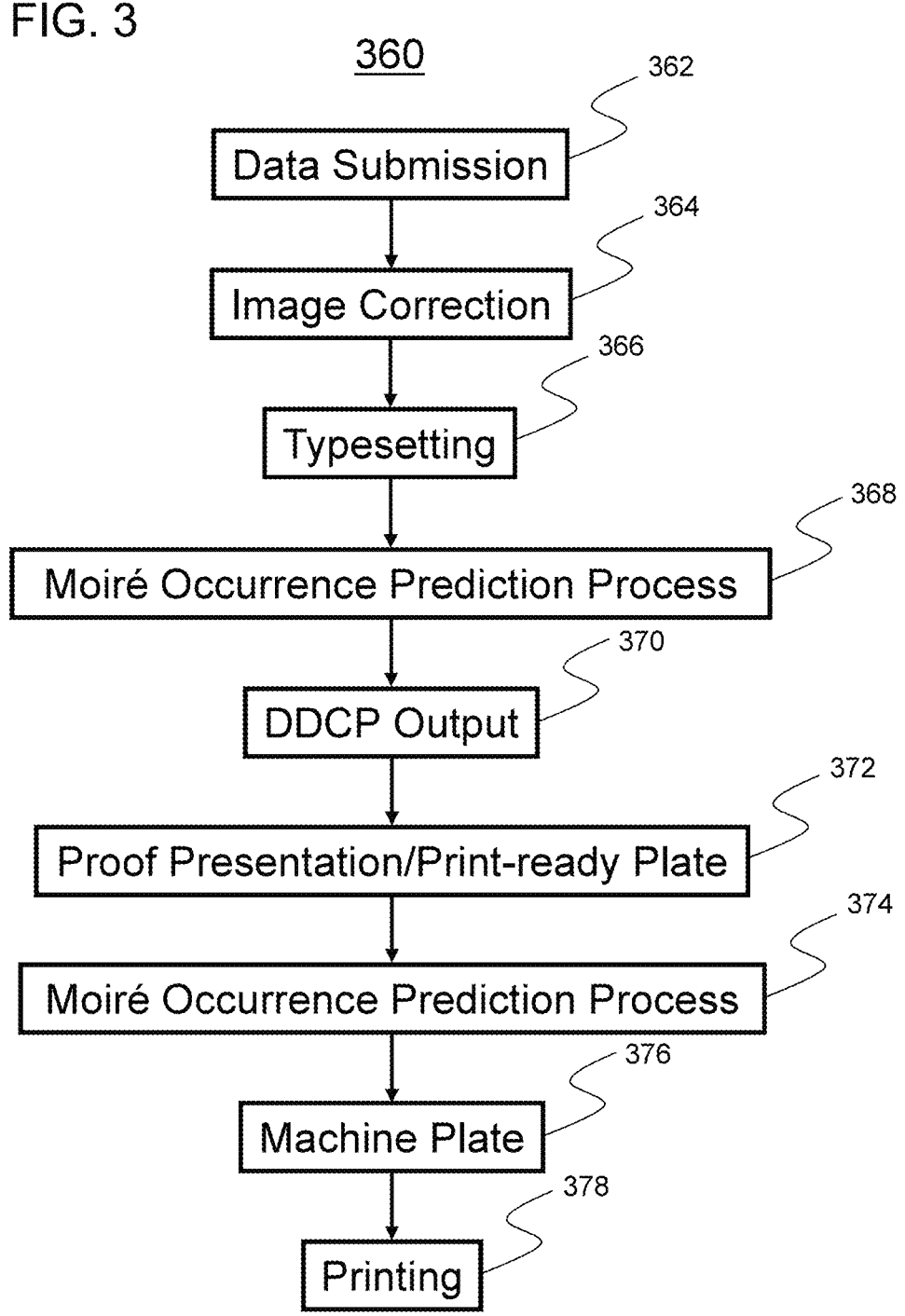
FIG. 3 is a diagram illustrating an overall flow of a printing process including the moiré occurrence prediction process according to the embodiments of the present disclosure.

FIG. 3 is a diagram illustrating the overall flow of a printing process 360 including the moiré occurrence prediction process according to the embodiments of the present disclosure. With the exception of the moiré occurrence prediction processes 368 and 374, the printing process 360 illustrated in FIG. 3 is substantially similar to what is known as offset printing. Accordingly, in the present disclosure, a detailed description of existing printing processes will be omitted, and the moiré occurrence prediction process according to the embodiments of the present disclosure will be primarily described.

In step 362, first, data submission is performed. Here, a user who wishes to request printing may input an original image to be printed, printing conditions, and the like using the client terminal illustrated in FIG. 2 for example.

Next, in step 364, the original image input in step 362 is corrected for printing. For example, an original image in a vector data format may be converted into a halftone dot image in a raster data format by a RIP process, or the resolution and size may be adjusted.

Next, in step 366, the arrangement of letters, diagrams, photographs, and the like in the image to be printed are adjusted based on, for example, the printing conditions input in step 362.

Next, in step 368, the moiré occurrence prediction process according to the embodiments of the present disclosure is performed. Here, the moiré occurrence prediction process is performed individually for each part of the image to be printed.

It should be noted that the details of the moiré occurrence prediction process will be described later with reference to FIG. 5 and the like.

Next, in step 370, a Direct Digital Color Proof (DDCP) of the images to be printed is generated, and digital data that can be directly output to the printer is prepared.

Next, in step 372, the digital data prepared in step 370 is transferred to the execution stage of printing (what is known as "proof presentation" or "print ready plates") after confirmation is completed.

Next, in step 374, the moiré occurrence prediction process according to the embodiments of the present disclosure is performed. The moiré occurrence prediction process performed in step 374 is substantially the same as the moiré occurrence prediction process of step 368 described above, but the moiré occurrence prediction process performed in step 374 is different in that the moiré occurrence prediction process is performed on the entire page to be printed.

Next, in step 376, a machine plate for printing is manufactured by baking a printing film (a plate-making film) created based on the digital data prepared in step 370 onto a plate material.

Next, in step 377, the printer performs printing using the machine plate produced in step 376.

As described above, the moiré occurrence prediction process according to the embodiments of the present disclosure is a process performed during an existing general offset printing process. Further, in the example illustrated in FIG. 3, the moiré occurrence prediction process according to the embodiments of the present disclosure is executed twice, after the end of the typesetting process in step 366 and after the end of the proof presentation/print-ready plate preparation step 372, but the present disclosure is not limited thereto, and a configuration in which the moiré occurrence prediction process is performed only once, or a configuration in which the moiré occurrence prediction process is performed three times or more is also possible. However, from the viewpoint of maintaining the overall efficiency of the printing process while accurately predicting and suppressing moiré, it is desirable to perform the moiré occurrence prediction process twice as illustrated in FIG. 3.

Next, with reference to FIG. 4, an example GUI for inputting input images according to the embodiments of the present disclosure will be described.

Figure 4:
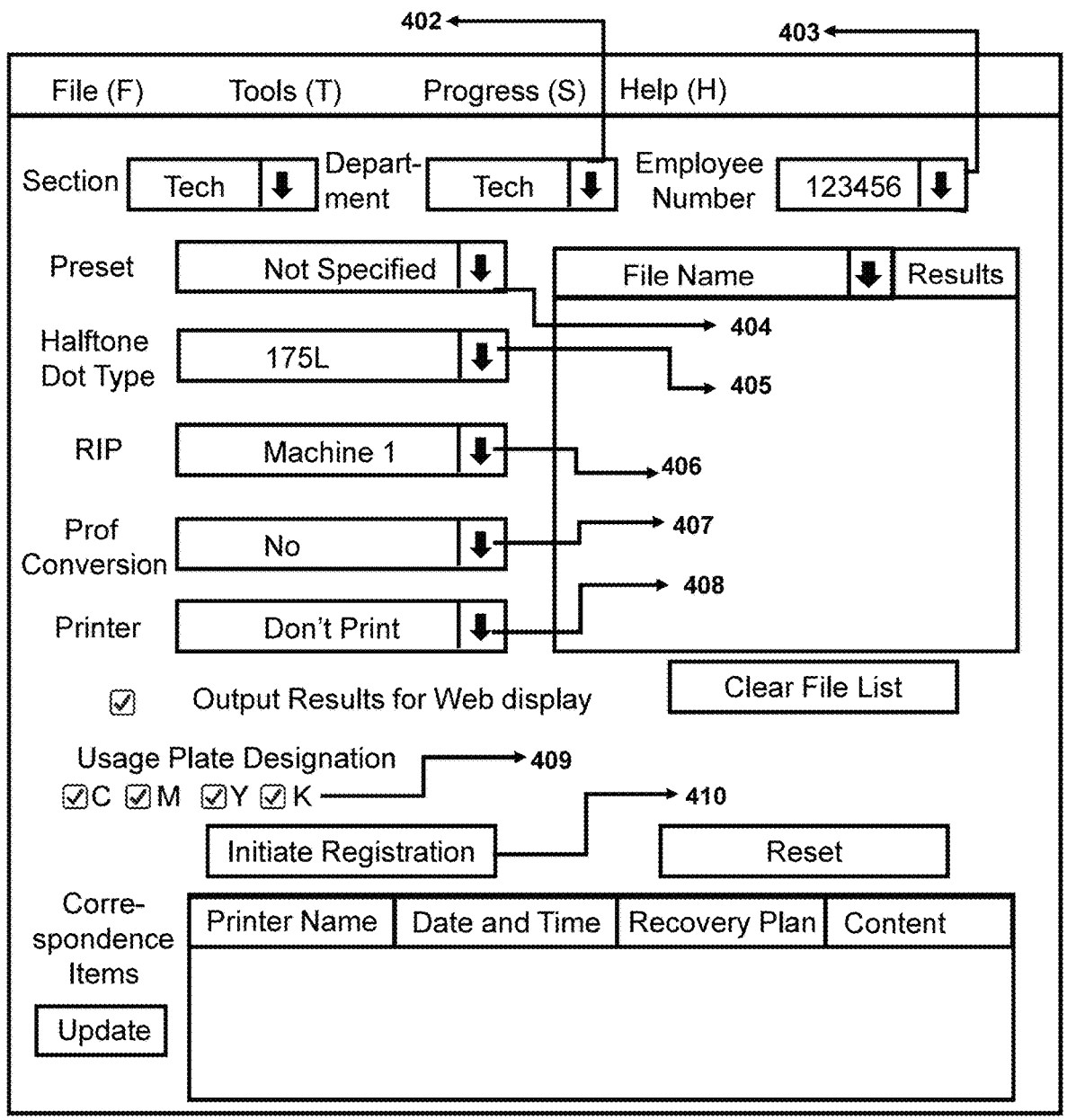
FIG. 4 is a diagram illustrating an example GUI according to the embodiments of the present disclosure.

FIG. 4 is a diagram illustrating an example GUI 400 for inputting input images according to the embodiments of the present disclosure. The GUI 400 is an interface for inputting an input image and print conditions of the input image to be subjected to the moiré occurrence prediction analysis according to the embodiments of the present disclosure.

The input images and print conditions entered through the GUI 400 are transmitted to the moiré occurrence prediction device. The GUI 400 may be, for example, a web interface or an interface on an application provided to a client terminal by the moiré occurrence prediction device via a communication network.

First, the user of the GUI 400 enters user data such as the section/department 402 and the employee number 403. In embodiments, the user of the GUI 400 may prepare a preset for each section and department in advance, and select a desired preset from among the stored presets. In addition, in embodiments, a job for printing and moiré occurrence prediction requested by a user via the GUI 400 is associated with an employee number of the user, and only the result of the job corresponding to the predetermined employee number can be displayed in the result list for the job. As a result, only the person who has requested the job can confirm the result of the job, and thus security can be improved, for example.

Next, the user may input the presets 404 registered in advance for each of the settings, the halftone dot type 405, the RIP processing machine designation 406 that designates the storage location of the RIP process algorithm or machine, the conditions 407 of the profile conversion (generating halftone dots under the designated conditions in the case that color conversion is applied to the machine plate), the printer 408 for designating the settings of the resulting auto-printout destination, and the usage plate 409 for designating the plates to be used in printing (for example, deleting the unnecessary plates in the case of two-color printing).

The content set by the halftone dot type 405 may include, for example, the settings of the halftone dot shapes (square dots, chain dots, and the like), the halftone dot angle and the number of lines for each ink, the resolution (2400 dpi/4000 dpi) of the 1-bit data to be written, and the auto-overprint (nukinose).

In addition, a configuration is also possible in which recommended settings are prepared in advance, and the recommended settings are automatically selected when the user selects a specific setting.

Next, the user may press the initiate registration button 410 to input the input image and the printing conditions of the input image to be subjected to the printing and the moiré occurrence prediction according to the embodiments of the present disclosure. In the case that there are a plurality of input images, the user may set the plurality of input images and the printing conditions corresponding to the respective input images all at once.

Here, the input image includes at least an image in a vector data format (hereinafter, referred to as an original image), but may also include a halftone dot image for printing. For example, in embodiments, the original image and a halftone dot image corresponding to the original image that has been subjected to a RIP process may be created by the client-terminal and input together via the GUI 400. In addition, in other embodiments, after the original image is input via the GUI 400, a halftone dot image corresponding to the original image that has been subjected to a RIP process may be created by the moiré occurrence predicting device. In the present disclosure, when it is not necessary to distinguish between the original image and the halftone dot image, these images are collectively referred to as an "input image."

The format of the inputted images may be any format, such as a PDF, RAW, JPEG, or the like.

In addition, the printing conditions here may include, for example, the number of colors, the designation of colors, the presence or absence of a characteristic color, a halftone dot type (halftone dot angle, the number of lines), and the like. These printing conditions may be input as a specific numerical value, may be input as a range, or may be selected from among templates prepared in advance. In some embodiments, each of these pre-prepared templates may correspond to a different printing line and include printing conditions for that printing line.

The above-described information regarding the settings, the input image, and the printing conditions are transmitted to the moiré occurrence prediction device via the communication network. Thereafter, the input image is analyzed by the moiré occurrence prediction process to be described later, and the moiré suppression process is performed only on regions where a moiré is predicted to occur. In this way, it is possible to mitigate print deterioration, suppress generation of moiré, and enable high-quality printing.

Next, with reference to FIG. 5, a moiré occurrence prediction process according to the embodiments of the present disclosure will be described.

Figure 5:
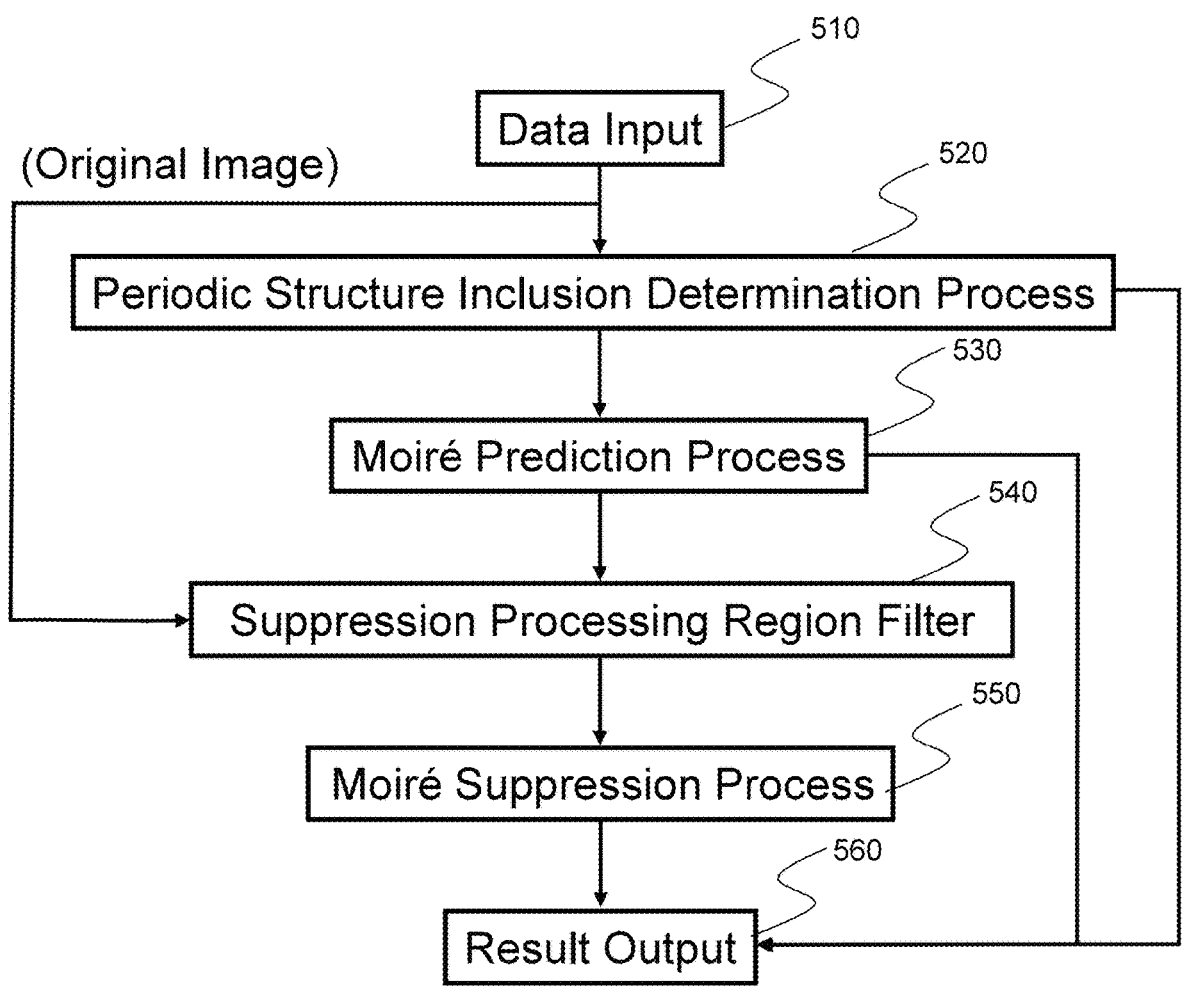
FIG. 5 is a diagram illustrating an example of a moiré occurrence prediction process according to the embodiments of the present disclosure.

FIG. 5 is a diagram illustrating an example of a moiré occurrence prediction process 500 according to the embodiments of the present disclosure. The moiré occurrence prediction process 500 illustrated in FIG. 5 is, for example, a process performed by the moiré occurrence prediction device 230 illustrated in FIG. 2, predicts a region where moiré will occur, and performs moiré suppression processing only on patterns that include this region.

It should be noted that the moiré occurrence prediction process 500 is a process corresponding to the moiré occurrence prediction processes 368 and 374 described with reference to FIG. 3.

First, in Step 510, the moiré occurrence prediction device inputs an input image to be subjected to printing and moiré occurrence prediction processing. Here, the moiré prediction device may receive an input image and printing conditions set via the GUI 400 described with reference to FIG. 4, for example.

The file format of the input images received here may be any file format such as a JPEG, GIF, TIFF, BMP, PNG, or the like. The input image may be from 10,000×10,000 pixels to 1,000,000×1,000,000 pixels, for example, and may be large image data.

At this time, the moiré occurrence prediction device may input, as the input image, both the vector data format image and the RIP processed halftone dot image corresponding to the original image, but when only the vector data format original image is transmitted from the client terminal, the moiré occurrence prediction device may perform RIP processing on the original image to generate a raster data format halftone dot image.

Further, after the input image is input, the pre-processing unit 232 of the moiré occurrence prediction device may divide the received input image into processing regions that are partitions of a fixed size. The size of a processing block is preferably, for example, a power of 2, but is not particularly limited. In addition, it is preferable that the processing blocks have the same size in the vertical and horizontal directions. For example, 128×128, 256×256, 512×512, 1024×1024, 2048×2048 or the like may be used as examples of the size of the processing block.

It should be noted that the actual size of the processing blocks may be equal to or larger than 2 mm and equal to or smaller than 50 mm.

In addition, the pre-processing unit may convert the resolution of the input images and set the resolution to be greater than or equal to 600 dpi and less than or equal to 2400 dpi.

In the subsequent processing (for example, the process 520 for extracting the structure-including regions and the moiré prediction process 530), the determination of the presence or absence of a periodic structure that induces moiré and the determination of the moiré detection are performed for each processing block. More specifically, it is possible to determine whether or not there is a periodic structure that will induce moiré by determining, from the two-dimensional data obtained by a discrete Fourier transform, whether or not a characteristic peak exists. The reason for dividing into processing blocks is that, rather than performing determination in a state in which various periodic structures are included, it is desirable to perform block division because it is easier to observe particular pattern information when divided into small regions and analyzed.

Next, in step 520, the periodic structure inclusion determination unit of the moiré occurrence prediction device determines a periodic structure region that includes a periodic structure that will induce the occurrence of moiré with respect to the original image in the vector data format.

It should be noted that the details of the periodic structure inclusion determination process will be described later with reference to FIG. 6.

Next, in step 530, the moiré prediction unit of the moiré occurrence prediction device performs a predetermined frequency analysis process on each periodic structure region determined by the periodic structure inclusion determination unit, thereby determining the degree of risk of a moiré occurring in each periodic structure region, and generating a moiré occurrence notification that indicates the degree of risk for each periodic structure region.

It should be noted that the details of the moiré prediction process will be described later with reference to FIG. 8.

Next, in step 540, with respect to the original image, the region extraction unit of the moiré occurrence prediction device extracts similar regions which have the same pattern as the region targeted for the moiré prediction process in step 530 by performing a color conversion process to convert the original image into a predetermined color space, and generating an element similarity map that indicates similar regions having similar pixel values.

It should be noted that a filter process of the suppression processing regions will be described later with reference to FIG. 12.

Next, in step 550, the moiré suppression unit of the moiré occurrence prediction device performs a predetermined moiré suppression process on the similar regions extracted in step 540. As the moiré suppression processing performed by the moiré prediction unit, a method of adjusting the size of the tone so that the individual tone densities of the halftone dot image match the original image densities at the same positions, or a method of converting the tone shape of the halftone dot image to a clean tone can be considered, but the moiré prediction process according to the embodiments of the present disclosure is not limited thereto, and any moiré suppression process may be performed.

Next, in step 560, the image in which the moiré is suppressed, which has been processed by the moiré suppression unit of the moiré occurrence prediction device, is output to the client terminal or the printing unit.

According to the moiré occurrence prediction process described above, by predicting a region in which moiré will occur and performing the moiré suppression process only on a pattern including this region, it is possible to suppress print deterioration, suppress the occurrence of moiré, and perform high-quality printing.

Next, with reference to FIG. 6, a periodic structure inclusion determination process according to the embodiments of the present disclosure will be described.

Figure 6:
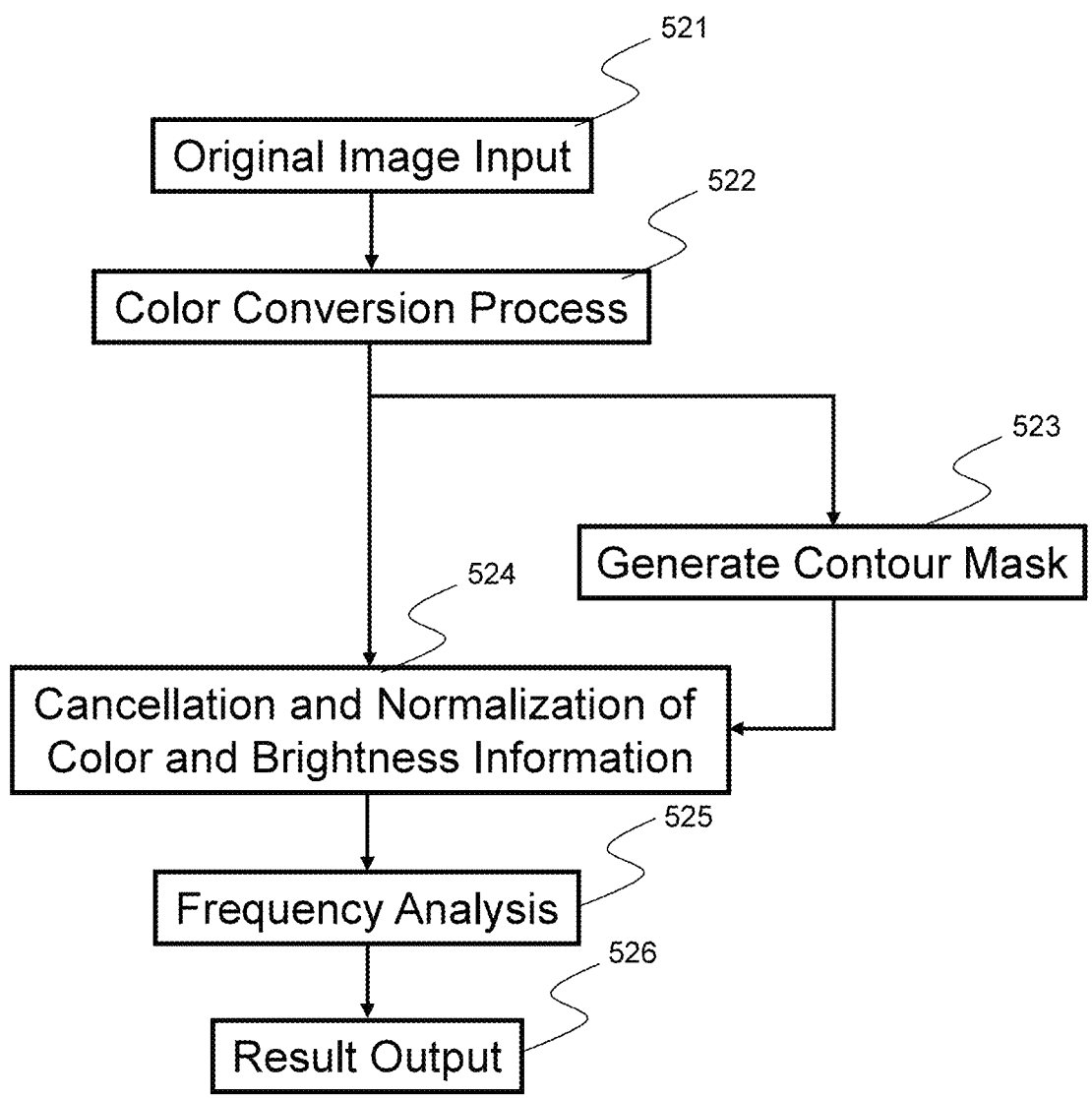
FIG. 6 is a diagram illustrating an example of the flow of a periodic structure inclusion determination process according to the embodiments of the present disclosure.

FIG. 6 is a diagram illustrating an example of a flow of the periodic structure inclusion determination process 520 according to the embodiments of the present disclosure. The periodic structure inclusion determination process 520 illustrated in FIG. 6 is a process performed by the periodic structure inclusion determination unit 233 illustrated in FIG. 2, and is a process for determining a periodic structure region in the original image that includes a periodic structure that induces the occurrence of moiré.

In general, moiré are generated by interference between the periodic structures included in the original image and the pitch and angle of the halftone dots. Accordingly, as described above, by performing the periodic structure inclusion determination process 520 according to the embodiments of the present disclosure on each of the processing blocks that constitute the original image, it is possible to determine periodic structure regions in the original image that include periodic structures that induce the occurrence of moiré. Further, as will be described later, by performing a predetermined frequency analysis process on the periodic structure regions determined in this way, it is possible to determine the degree of risk of moiré occurrence in each periodic structure region and generate a moiré occurrence notification that indicates the degree of risk for each periodic structure region.

It should be noted that the processing blocks determined not to include periodic structures are not subjected to the moiré prediction process, the moiré suppression process, or the like, which will be described later. As described above, by performing the moiré prediction process, the moiré suppression process, and the like, which will be described later, only for those blocks that include a periodic structure that induces the occurrence of moiré, the processing speed can be increased as compared with conventional moiré suppression means, and the quality deterioration caused by performing the moiré suppression process on the extra regions that do not include moiré can be suppressed.

First, in step 521, the periodic structure inclusion determination unit inputs the original image. Here, the periodic structure inclusion determination unit may acquire the original image received from the client terminal using the communication unit and preprocessed by the preprocessing unit from the storage unit.

Next, in step 522, the periodic structure inclusion determination unit performs a color conversion process for converting the original image into an arbitrary color space. In this color conversion process, an original image composed of the colors of RGB may be converted into a LUV color space or a LAB space.

Among the components of the converted color, a luminance component with high visibility can be used. In addition, since there is a difference in luminosity between a* and b*, weighting corresponding to the difference may be performed. Furthermore, only one of a* and b* may be used.

Next, in step 523, the periodic structure inclusion determination unit generates a mask from which the contour component of the original image is extracted (that is, removed or eliminated).

More specifically, when determining the presence or absence of a periodic structure in the original image, in the case that a boundary where the brightness abruptly changes, such as the vicinity of the outline of the object, exists within the processing block, the high-frequency components resulting from parts of the boundary may become noise, and the S/N ratio (Signal/Noise Ratio) at the time of the determination may decrease. Therefore, it is desirable to perform frequency analysis after pre-processing to remove boundaries where sudden luminance changes exist.

Accordingly, the periodic structure inclusion determination unit generates a mask from which the contour components are extracted from the original image after the color-conversion, thereby avoiding a low S/N ratio and improving the accuracy of the periodic structure inclusion determination.

Next, in step 524, the periodic structure inclusion determination unit performs a process of normalizing the maximum value and the minimum value of the pixels in the original image.

More specifically, in the frequency analysis which will be described later, it is possible to determine the periodic structures that will induce the occurrence of moiré by determining from the two-dimensional data obtained by a discrete Fourier transform whether or not a specific peak is included. When the presence or absence of the periodic structures in the original image is determined, it is possible to further increase the accuracy of the periodic structure inclusion determination by removing the aforementioned contour components and normalizing the density information (color/brightness information) of the structure. As an example, a smoothing process can be performed on the original image after color conversion, the difference before and after smoothing can be extracted, and normalization can be performed so that the maximum and minimum values of the pixel values become specific values. However, the present disclosure is not limited hereto, and any normalization means may be used.

Next, in step 525, the periodic structure inclusion determination unit performs a frequency analysis process on the original image subjected to the color conversion process, the contour mask generation process, and the normalization process described above. As the frequency analysis process at this time, for example, a Fast Fourier Transform (FFT) can be mentioned as a representative algorithm. FFT is an algorithm that speeds up Discrete Fourier Transforms (DFTs), which are Fourier transforms for discrete data.

The power spectrum image generated by performing FFT on the original image has a frequency of zero at its center position, and has a distribution such that the frequency components in each direction increase in frequency away from the center.

The characteristics of the frequency distribution of an image including a periodic structure that induces the occurrence of moiré are that high-intensity frequency components are concentrated in a specific region, that the maximum peak intensity is high, and that high-intensity frequency components are also present in high-frequency regions.

On the other hand, in the frequency distribution of an image that does not include a periodic structure, frequency components having a high intensity are dispersed in low frequency regions.

Accordingly, in step 525, in order to determine the presence or absence of periodic structures that induce the occurrence of moiré, the periodic structure inclusion determination unit quantitatively calculates the peak position, the peak intensity, and the intensity distribution when the frequency distribution is divided into arbitrary angle increments as feature values. After that, the obtained feature values are evaluated, and the degree of risk of moiré occurrence can be determined for each block.

It should be noted that examples of the method of evaluating the feature values include a method of evaluating each feature value by setting a threshold value, a method of evaluating the feature value based on likelihood after a regression analysis, a method of classifying the presence or absence of moiré by cluster analysis, or a combination of the methods described above.

Next, in step 526, the information of the periodic structure regions that include periodic structures determined by the above-described processing are output to the moiré prediction unit.

Next, with reference to FIG. 7, a frequency analysis according to the embodiments of the present disclosure will be described.

Figure 7:
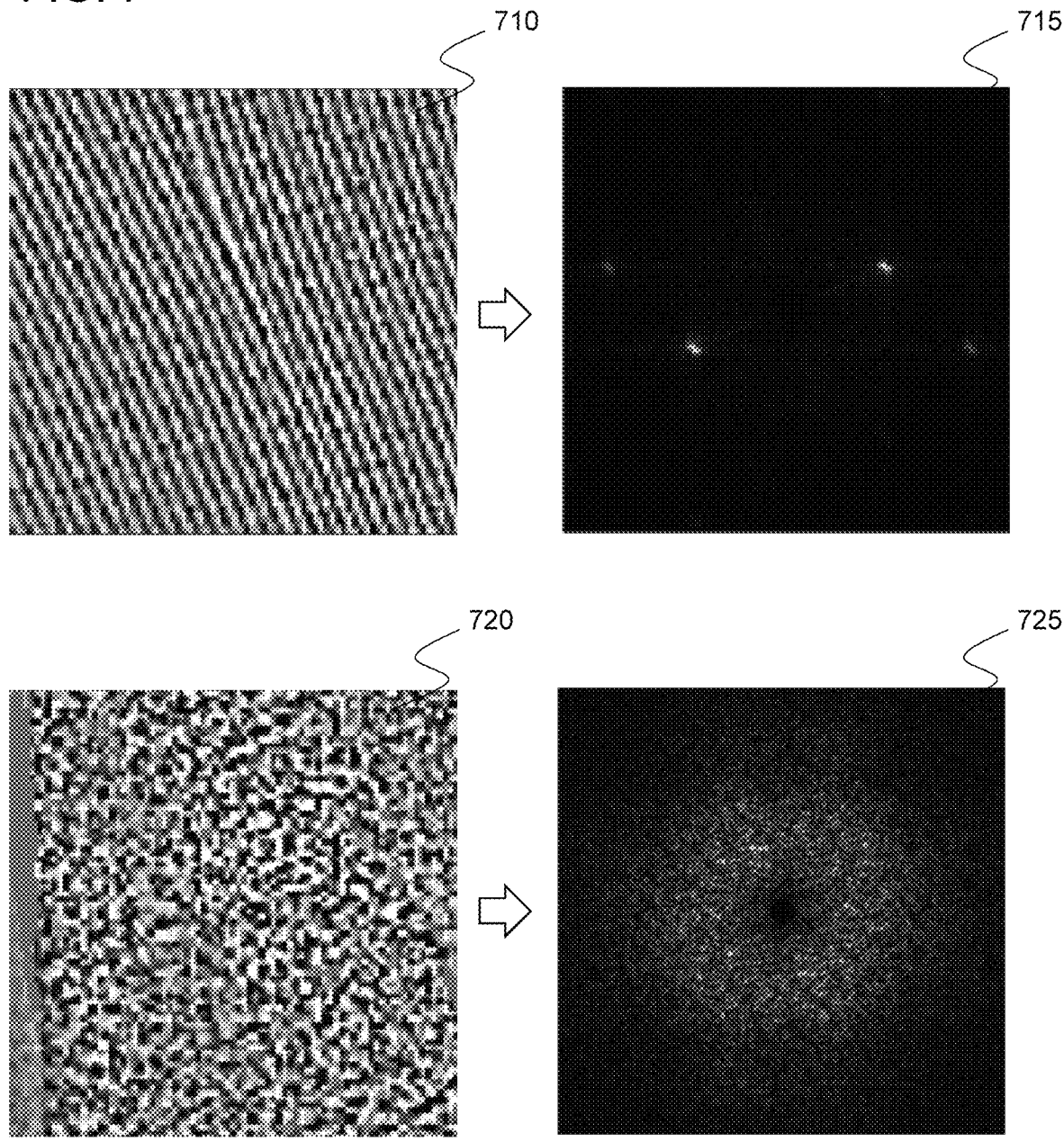
FIG. 7 is a diagram illustrating an example of a frequency analysis according to the embodiments of the present disclosure.

FIG. 7 is a diagram illustrating an example of frequency analysis according to the embodiments of the present disclosure. As described above, in the moiré occurrence prediction process according to the embodiments of the present disclosure, by performing a frequency analysis process on the input image (the original image and/or the halftone dot image), it is possible to determine the periodic structures that induce the occurrence of moiré in the input image, and to predict the degree of risk of moiré occurrence.

FIG. 7 is a diagram illustrating frequency-analyzed images 715 and 725 obtained by performing the frequency analysis process on each of the input images 710 and 720. As described above, since moiré is a periodic structure of light and dark, examples of the characteristics of the frequency distribution of an image including a periodic structure that induces the occurrence of moiré are that high-intensity frequency components are concentrated in a specific region, that the maximum peak intensity is high, and that high-intensity frequency components are also present in high-frequency regions.

On the other hand, in a frequency distribution of an image that does not include a periodic structure, frequency components having a high intensity are dispersed in low frequency regions.

Accordingly, by performing the frequency analysis process according to the embodiments of the present disclosure on the input image, it is possible to determine whether or not there is a periodic structure in the input image that induces moiré.

As an example, by performing the above-described frequency analysis process on the input image 710, a frequency-analyzed image 715 having spectral components with high peak intensities which are spaced apart at regular intervals is obtained. From the periodic distribution of the spectral components appearing in the frequency-analyzed image 715 and the intensity of the peaks, the input image 710 is determined as having a periodic structure that induces moiré.

On the other hand, as another example, by performing the above-described frequency analysis process on the input image 720, a frequency-analyzed image 725 having a frequency distribution in which the spectral components having high intensity are dispersed in the low frequency region is obtained. From the distribution of the spectral components of the frequency-analyzed image 725, the input image 720 is determined as having no periodic structure that induces moiré.

Accordingly, as described below, by performing the frequency analysis process according to the embodiments of the present disclosure on an arbitrary input image, it is possible to determine a region including periodic structures that induce moiré. In addition, by performing the moiré suppression process only on the regions that include periodic structures that induce moiré, it is possible to mitigate print deterioration, suppress the occurrence of moiré, and provide high-quality printed materials.

Next, with reference to FIG. 8, a moiré prediction process according to the embodiment of the present disclosure will be described.

Figure 8:
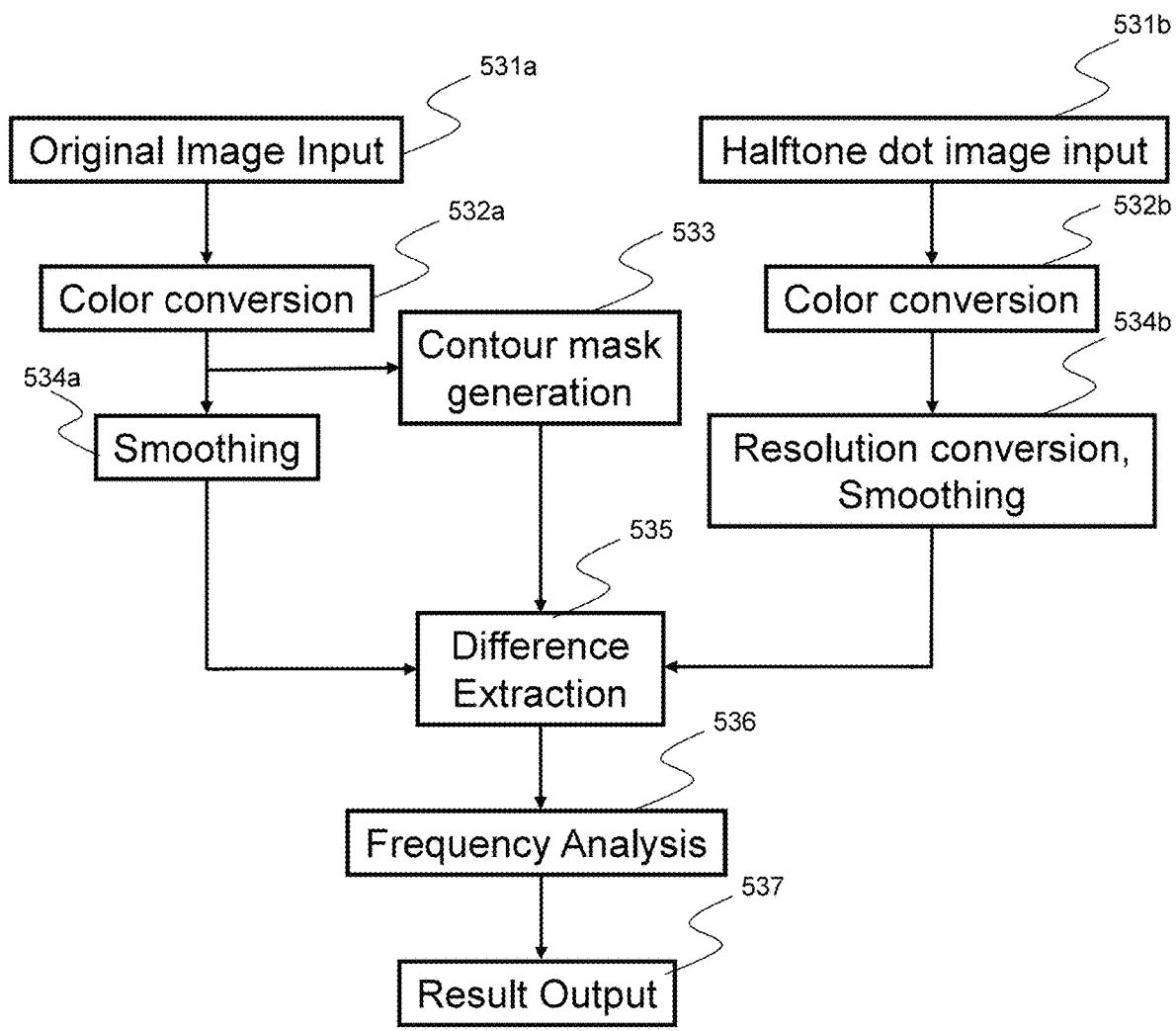
FIG. 8 is a diagram illustrating an example of the flow of a moiré prediction process according to the embodiments of the present disclosure.

FIG. 8 is a diagram illustrating an example of a flow of a moiré prediction process 530 according to the embodiments of the present disclosure. The moiré prediction process 530 illustrated in FIG. 8 is a process performed by the moiré prediction unit 234 illustrated in FIG. 2, and is a process for predicting moiré for each processing block of the periodic structure region determined to include a periodic structure that induces moiré, and determining the degree of risk of moiré occurrence.

The halftone dot image and the original image obtained from the RIP process have different resolutions and depiction methods, but the components other than moiré, such as color/brightness/pattern information, are the same. Accordingly, in the moiré prediction process 530, the moiré components can be extracted by aligning and comparing the resolutions and depictions of both images. After that, by performing frequency analysis on the moiré component, it is possible to predict the occurrence of moiré for each processing block in the periodic structure regions, and to determine the degree of risk of moiré occurrence.

First, in step 531*a* and step 531*b*, the original image and the halftone dot image are input. Here, the moiré prediction unit may acquire, from the storage unit, the original image subjected to the periodic structure inclusion determination process and the halftone dot image corresponding to the original image.

Next, in step 532*a* and step 532*b*, the moiré prediction unit performs a color conversion process for converting the original image and the halftone dot image into a predetermined color space.

More specifically, the original image and the halftone dot image are image data separated as Cyan, Magenta, Yellow, Black (CMYK), for instance, but in some cases, moiré manifests as the result of the overlapping of a plurality of plates. Accordingly, since there are moiré that cannot be extracted even when the images of respective plates are compared with each other, it is desirable to combine the information of the plates and perform color conversion in order to detect the moiré that occur due to the overlapping of a plurality of plates. Examples of the color-conversion include a Lab and a LUV space.

It should be noted that the subsequent processing is performed on the obtained brightness image (for example, L) and color image (for example, a and b). In addition, the color conversion result of the original image generated by the above-described periodic structure inclusion determination may be used.

Next, in step 533, the moiré prediction unit generates a mask that extracts (that is, removes and eliminates) the contour component of the original image.

When performing the resolution conversion which will be described later on the halftone dot image, there is a possibility that the halftone dot image may, with respect to the original image, have a misalignment of the outline of the pattern, or the outline may become thicker or thinner. Accordingly, when the difference extraction process to be described later is performed, if the halftone dot image and the original image are compared and the density difference is obtained between the images, there is a possibility that an accurate difference cannot be extracted. Accordingly, in a finely represented region in an image, although there is no sense of discomfort due to the optical illusion effect when viewed macroscopically, when the pixel value data between the halftone dot image and the original image are compared, there is a tendency for large errors to occur.

Accordingly, in view of the above, in order to extract a more high-quality difference, the contour component is extracted with respect to the original image, and a contour mask for excluding the contour region from the analysis target is created.

It should be noted that the contour mask generated by the above-described periodic structure inclusion determination may be used.

Next, in step 534*a*, the moiré prediction unit performs a smoothing process on the original image. This smoothing process is a process of performing a filtering process on the original image and smoothing the pixel of interest while including information about the neighboring pixel values. Examples of the smoothing filter include a moving average filter having a uniform weight with respect to neighboring pixels, and a Gaussian filter having a larger weight with respect to the pixel of interest, and either of them may be used.

It should be noted that the degree of smoothing depends on the size of the smoothing filter, and it is desirable to reduce the size of the filter as the number of lines increases. When the number of lines is small, the halftone dots are large, so it is necessary to perform strong smoothing in order to eliminate the halftone dots, and when the number of lines is large, strong smoothing may cause a new moiré.

Next, in step 534*b*, the moiré prediction unit performs a resolution conversion process for aligning the resolution of the halftone dot image with the resolution of the original image and a smoothing process on the halftone dot image.

In the state prior to the resolution conversion process, the halftone dot image is 1-bit data, and the resolution is high. On the other hand, the original image is depicted in 8-bit grayscale, and the resolution is lower than that of the halftone dot image (for example, the halftone dot image may be 2400 dpi, and the original image may be 600 dpi, or the like). Accordingly, in order to extract a higher-quality difference, it is desirable to perform resolution conversion on the halftone dot image and smoothing to align the depictions.

Typical methods of resolution conversion include the nearest neighbor method, the bicubic method, and the bilinear method. However, when the halftone dot image is compressed with the nearest neighbor method, the halftone dot image becomes too coarse, and when the halftone dot image is compressed by the bicubic method, the smoothing when interpolation is performed is too strong, which may cause a problem in the subsequent analysis. For this reason, resolution compression by the bilinear method is desirable.

It should be noted that the smoothing process performed on the halftone dot image in step 534*b* is substantially the same as the smoothing process performed on the original image in step 534*a*, and therefore will not be described here. In addition, with regard to the order of processing, it is desirable to perform resolution conversion and smoothing after color conversion for the halftone dot image. This is because the strength component of moiré resulting from overlapping plates is weakened.

Next, in step 535, the moiré prediction unit generates a difference extraction image representing the pixel difference between the halftone dot image subjected to the color conversion process, the smoothing process, and/or the resolution conversion process described above and the original image, and multiplies the difference extraction image by the contour mask described above to extract the moiré component.

Next, in step 536, the moiré prediction unit performs a frequency analysis process on the image data subjected to the above processing. Since the frequency analysis process is substantially the same as the frequency analysis process in the structure inclusion determination process described with reference to FIG. 4, for example, a detailed description thereof will be omitted here.

In the frequency analysis process, the peak position of the frequency component, the peak intensity, and the intensity distribution when the frequency distribution is divided into arbitrary angular increments are quantitatively calculated as feature values. Accordingly, the evaluation is performed based on the feature values obtained in this manner, and the degree of risk of moiré occurrence can be determined for each block.

In addition, in order to mitigate the influence of high-frequency noise including Rosetta patterns on the determination and in order to conform with human visual sensitivity, it is desirable to improve the accuracy through a low-pass filter. The low-pass filter is preferably a Gaussian filter or a Welch filter whose strength decreases with increasing distance from the direct flow component. The size of the low-pass filter is set to a size similar to the visual sensitivity of humans, according to the grid size.

It should be noted that, in order to reflect the information on the peak position with a dark color, in the extraction of the feature values, it is desirable to improve the evaluation accuracy by extracting the feature values separately for the low frequency and high frequency regions using the two types of masks described later with reference to FIG. 9. The boundary between the low-frequency and high-frequency regions may be a fixed value or may be a function of the number of lines. The function may be a monotonic function.

The feature values obtained by performing the frequency analysis process are evaluated, and the degree risk of moiré occurring in each processing block is determined. Here, the degree of risk of moiré occurrence is a measure indicating a possibility of occurrence of a moiré, and may be expressed in any number of stages. For example, in some embodiments, the degree of risk of moiré occurrence may be expressed in three stages such as: 3: No possibility of moiré occurrence, 2: Possibility of moiré occurrence, 1: High possibility of moiré occurrence. In addition, in some embodiments, each of the processing blocks may be colored with a predetermined pseudo-color in accordance with the possibility that moiré will occur in that block (gray: no possibility of moiré occurrence, yellow: possibility of moiré occurrence, red: high possibility of moiré occurrence). In yet another embodiment, each of the processing blocks may represent the probability of moiré occurrence in that block as a percentage.

It should be noted that examples of the evaluation method described above include a method of evaluating each feature value by setting a threshold value, a method of evaluating the feature value based on likelihood after a regression analysis, a method of classifying the presence or absence of moiré by cluster analysis, or a combination of the methods described above. In addition, the threshold for determination may be set in two steps. For example, when a relaxed condition of "moiré advisory" and a strict condition of "moiré warning" are set, the image correction process can be judged based on the moiré advisory, and the printing process can be judged based on the moiré warning.

Next, in step 537, the moiré prediction unit may generate and output a moiré occurrence notification that indicates the degree of risk of moiré occurrence for each processing block. As described above, the moiré occurrence notification may be, for example, an image indicating the degree of risk of moiré occurrence for each processing block (see FIG. 12).

In an embodiment, after transmitting the generated moiré occurrence notification to the client terminal, the client terminal that has received the moiré occurrence notice may perform the moiré suppression processing on the client terminal side.

In yet another embodiment, the moiré prediction unit may output the generated moiré occurrence notification to the region extraction unit 235, and then a moiré suppression process may be performed on the moiré occurrence prediction device side. Thereafter, the communication unit may transmit both the moiré occurrence notification and the image subjected to the moiré suppression process to the client terminal.

In yet another embodiment, the moiré prediction unit may extract only the processing blocks that satisfy a predetermined risk criterion (for example, those for which the risk of moiré occurrence is high) and transmit the extracted processing blocks to the client terminal. This makes it possible to reduce the capacity of data to be transmitted.

According to the above-described processing, it is possible to predict the risk of occurrence of moiré for each of the plurality of processing blocks that constitute the original image. In addition, based on this degree of risk, the moiré suppression processing is performed only on the processing blocks for which moiré occurrence is predicted, whereby it is possible to mitigate print deterioration, suppress the occurrence of moiré, and perform high-quality printing.

Next, with reference to FIG. 9 to FIG. 10, an example in which frequency analysis is performed on a difference extraction image according to the embodiments of the present disclosure will be described.

Figure 9:
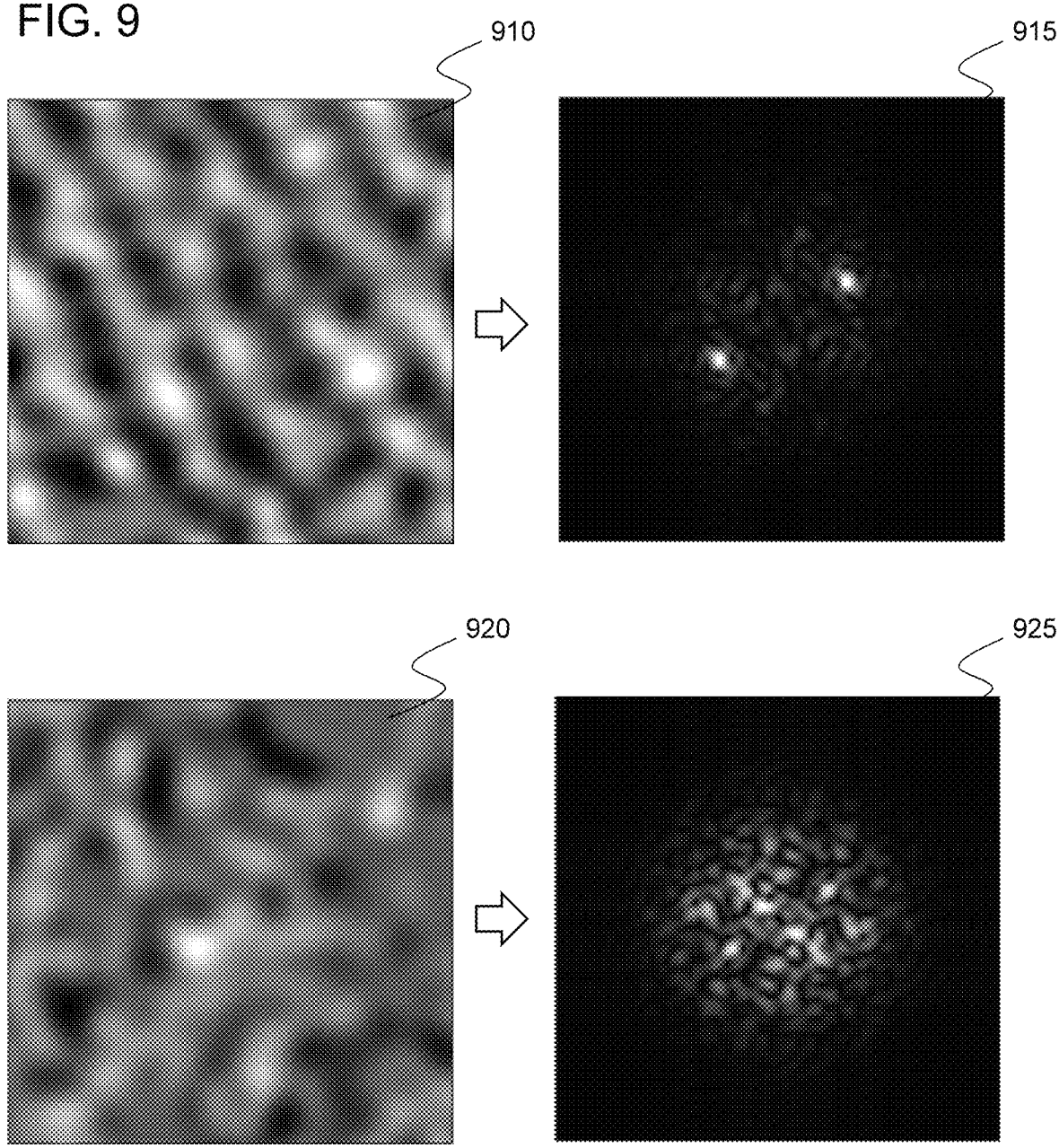
FIG. 9 is a diagram illustrating an example of a case where frequency analysis is performed on a difference extraction image according to the embodiments of the present disclosure.

FIG. 9 is a diagram illustrating an example of a case where frequency analysis is performed on a difference extraction image according to an embodiment of the present disclosure. As described above, in the moiré occurrence prediction process according to the embodiments of the present disclosure, by performing a frequency analysis process on a difference extraction image generated by comparing the original image and the halftone dot image, the peak position of the frequency component, the peak intensity, and the intensity distribution when the frequency distribution is divided into arbitrary angular increments can be quantitatively calculated as feature values, and the risk of moiré occurrence can be predicted based on these feature values.

FIG. 9 is a diagram illustrating frequency-analyzed images 915 and 925 obtained by performing a frequency analysis process on each of the difference extraction images 910 and 920.

As an example, by performing the above-described frequency analysis process on the difference extraction image 910, a frequency-analyzed image 915 that has spectral components with high peak intensities that are spaced apart at regular intervals is obtained.

On the other hand, as another example, by performing the above-described frequency analysis process on the difference extraction image 820, a frequency-analyzed image 925 having a frequency distribution in which high-intensity frequency components are dispersed in the low-frequency region is obtained.

FIG. 10 is a diagram illustrating an example of a case where a moiré is determined using a threshold value after frequency analysis has been performed on a difference extraction image according to the embodiments of the present disclosure. More specifically, FIG. 10 illustrates an example in which two filters (here, a narrow-band filter and a wide-band filter) are applied to each of the frequency-analyzed images 915 and 925 shown in FIG. 9, and the ratio of the values in the two filters is set as a threshold for determining moiré. By using this threshold, it is possible to distinguish between noise and moiré.

For example, when a narrow-band filter and a wide-band filter are applied to the frequency-analyzed image 915, Enarrow/Ewide, which is the ratio of the sum Enarrow of the spectral components in the narrow-band filter to the sum Ewide of the spectral components in the wide-band filter, is calculated as 0.7.

On the other hand, when the narrow-band filter and the wide-band filter are applied to the frequency-analyzed images 925, Enarrow/Ewide, which is the ratio of the sum Enarrow of the spectral components in the narrow-band filter to the sum Ewide of the spectral components in the wide-band filter, is calculated as 0.3.

Assume that 0.5☐Enarrow/Ewide☐0.99 is set as a threshold for determining moiré. That is, when Enarrow/Ewide, which is the ratio of the sum Enarrow of the spectral components in the narrow-band filter to the sum Ewide of the spectral components in the wide-band filter, satisfies 0.5☐Enarrow/Ewide☐0.99, it is determined that moiré is present in the image, and when Enarrow/Ewide is less than 0.5, it is determined that the image is noisy.

In this way, after the frequency analysis process is performed on the target image, by applying two filters (here, a narrow-band filter and a wide-band filter) and setting the ratio of the values in the two filters as a threshold value for determining moiré, it is possible to predict whether moiré will occur in the target image based on this threshold value.

Further, in addition to the above thresholds, the absolute values of Enarrow and Ewide may be used as an index of the intensity of the moiré. The threshold at that time may be set by an operator according to the type of image or printing.

Next, with reference to FIG. 11, the masks used in the frequency analysis process according to the embodiments of the present disclosure will be described.

FIG. 11 is a diagram illustrating an example of the masks used in the frequency analysis process according to the embodiments of the present disclosure. As described above, in the frequency analysis process according to the embodiments of the present disclosure, the peak position of the frequency component, the peak intensity, and the intensity distribution when the frequency distribution is divided into arbitrary angular increments can be quantitatively calculated as feature values. In the calculation of these feature values, it is desirable to use a mask in order to reflect the information on the peak position with a dark color. Examples of the mask used here include the low-frequency mask 1110 and the high-frequency mask 1120 illustrated in FIG. 11. By using two types of masks including the low-frequency mask 1110 and the high-frequency mask 1120 shown in FIG. 11 in the frequency analysis process, the feature values can be calculated individually for each of the low-frequency region and the high-frequency region, and thus the evaluation accuracy of the moiré described above can be increased.

The boundaries between the low-frequency region and the high-frequency region may be fixed values or may be a function of the number of lines. This function may be a monotonic function.

It should be noted that in the low-frequency mask 1110 and the high-frequency mask 1120 illustrated in FIG. 11, the white region indicates effective pixels.

Next, with reference to FIG. 12, the filter process of the suppression processing region according to the embodiments of the present disclosure will be described.

Figure 12:
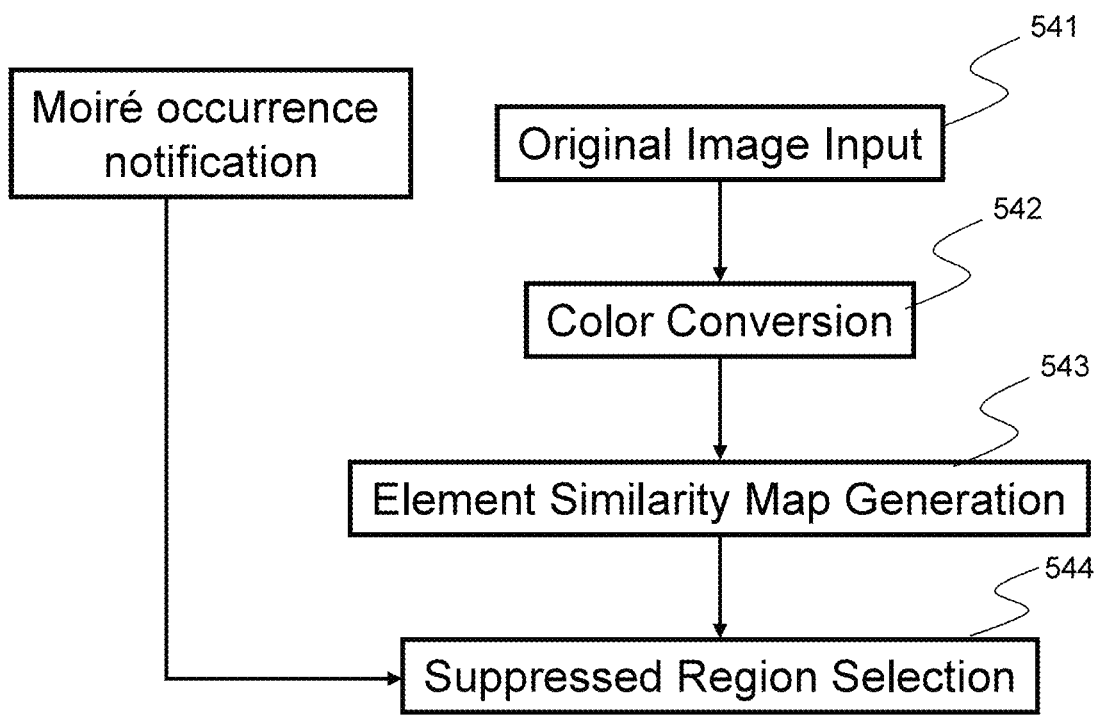
FIG. 12 is a diagram illustrating an example of the flow of a filter process for suppression processing regions according to the embodiments of the present disclosure.

FIG. 12 is a diagram illustrating an example of the flow of a filter process 540 with respect to the suppression processing regions according to the embodiments of the present disclosure. The filter process 540 of the suppression processing regions illustrated in FIG. 12 is a process performed by the region extraction unit 235 illustrated in FIG. 2, and is a process for extracting similar regions having similar elements.

More specifically, at the stage where the above-described moiré prediction process is completed, a moiré occurrence notification indicating the degree of risk of moiré occurrence per arbitrary size processing block unit is obtained. By performing the moiré suppression process on those processing blocks for which moiré occurrence is predicted, this moiré can be removed. However, if the suppression process is performed for each processing block, there is a possibility that the presence or absence of the moiré suppression process may be visually recognized in a block shape. That is, when there are processing blocks with similar depictions or patterns in an image, and the moiré suppression process is applied to only a portion of these processing blocks, a visual difference may occur between those processing blocks for which the moiré suppression process has been performed and those processing blocks for which the moiré suppression process has not been performed, which may give users a sense of discomfort.

Accordingly, in the filter process 540 of the suppression processing regions according to the embodiments of the present disclosure, by dividing the original image into similar regions having shared depictions or patterns, and performing the moiré suppression process for each similar region, the problem of visually recognizing the presence or absence of the moiré suppression processing can be solved.

The details of the filter process 540 for the reduction processing regions will be described below. Note that the filter process 540 of the suppression processing regions is processing performed on the original image that is not divided into the processing blocks.

First, in step 541, the region extraction unit 235 inputs the original image. Here, the region extraction unit 235 may acquire the original image from the storage unit of the moiré occurrence prediction device.

Next, in step 542, the region extraction unit 235 performs a color conversion process for converting the original image into an arbitrary color space. In this color conversion process, an original image composed of the colors of RGB may be converted into LUV color space or a LAB space.

Here, the region extraction unit 235 may use, for example, the color conversion result of the original image generated in the periodic structure inclusion determination process 520 described above.

Next, the region extraction unit 235 divides the original image into similar regions having shared depictions or patterns, and generates an element similarity map that indicates the similar regions that have similar pixel values.

Here, as a method of dividing the original image into similar regions having shared depictions or patterns, calculating Sobel values with respect to the original image and perform a smoothing process can be considered. By means of such processing, an element similarity map having pixel values similar to each depiction or pattern is generated. In addition, with regard to the division of each similar region, a method of dividing the similar regions based on the presence or absence of a fine periodic structure as in the above processing is desirable.

As described above, moiré occurs only when a fine periodic structure is included, and if there are similar regions having the same pattern, since the pixel values are uniformly distributed over the entire surface by the above-described processing, the above-described method is efficient in the subsequent processing and aligns with the intentions of the user.

It should be noted that, as a method of dividing the similar regions, a method based on brightness or chromaticity, or image processing such as semantic segmentation may be used.

By performing contour extraction on the element similarity map obtained in this processing, information on the boundary lines of each similar region is obtained.

Next, in step 544, the region extraction unit 235 selects a region to be subjected to the suppression processing based on the boundary line information of the similar regions obtained in step 543 and the moiré occurrence notification obtained by the moiré prediction process 530 described above. Here, FloodFill (a filling algorithm) may be used as a method for combining information, or other image processing techniques may be used.

According to the above-described filter process 540 for the suppression processing regions, the original image can be divided into similar regions having shared depictions or patterns, and therefore, it becomes possible to perform the moiré suppression process in units of similar regions. The similar regions extracted by the filter process 540 for the suppression processing region proceed to the moiré suppression process in the moiré occurrence prediction process 500 illustrated in FIG. 5, and are subjected to the moiré suppression process.

Next, with reference to FIG. 13, a moiré occurrence notification according to the embodiments of the present disclosure will be described.

FIG. 13 is a diagram illustrating an example of a moiré occurrence notification 1300 according to the embodiments of the present disclosure. As described above, the moiré occurrence notification 1300 according to the embodiments of the present disclosure is information indicating the degree of risk of moiré occurrence for each processing block. As illustrated in FIG. 13, in an embodiment, the moiré occurrence notification 1300 may be an image that indicates the risk of moiré occurrence for each processing block.

As described above, in the moiré occurrence notification 1300 illustrated in FIG. 13, each of the processing blocks may be colored with a predetermined pseudo color in accordance with the possibility that moiré will occur in that block. For example, in the moiré occurrence notification 1300, a processing block 1330 in which there is no possibility of moiré occurrence may be gray, a processing block 1320 (advisory area) in which there is a possibility of moiré occurrence may be yellow, and a processing block 1310 in which there is a high possibility of moiré occurrence may be red.

Next, an example of processing blocks according to the embodiments of the present disclosure will be described with reference to FIG. 14.

Figure 14:
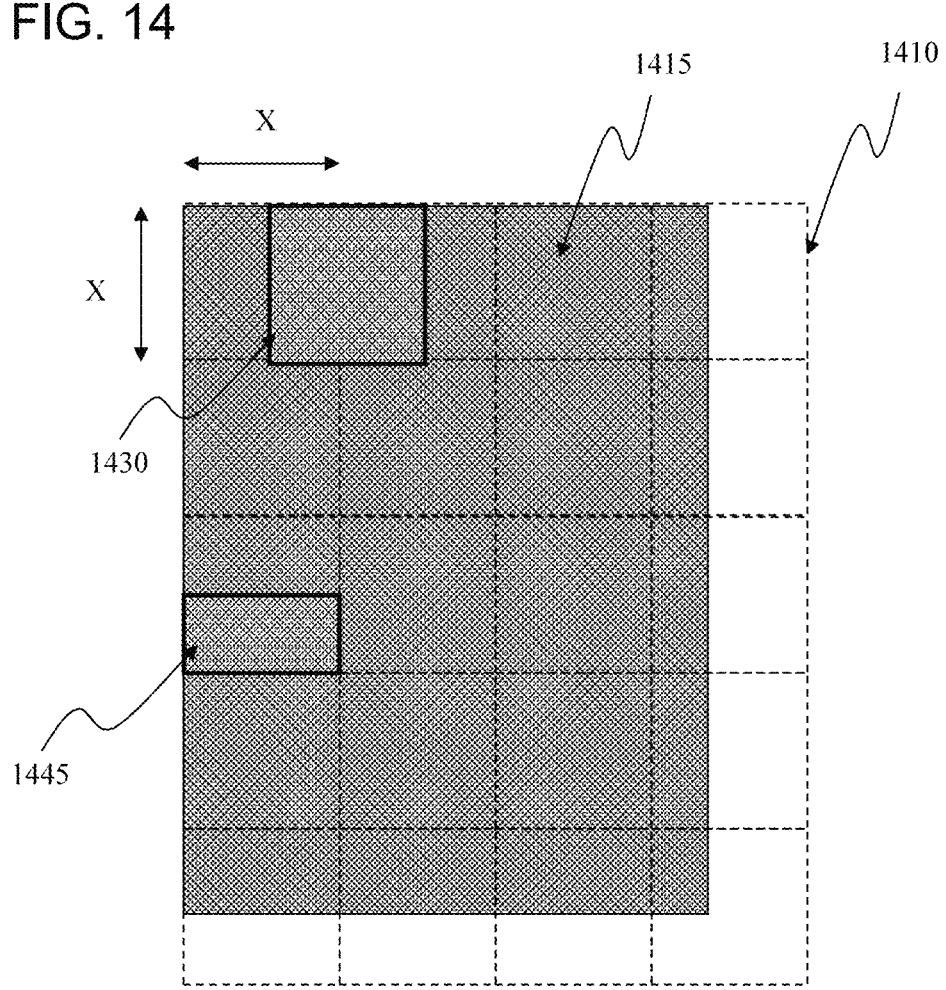
FIG. 14 is a diagram illustrating an example of processing blocks according to the embodiments of the present disclosure.

FIG. 14 is a diagram illustrating an example of processing blocks according to the embodiments of the present disclosure. As described above, the processing blocks here are small regions obtained by dividing the original image into sections of a fixed size, and are the units on which processing is performed.

As illustrated in FIG. 14, the original image 1410 may be divided into 20 (4×5) fixed-size processing blocks 1415. The size of the processing blocks 1415 is preferably, for example, a power of 2, but is not particularly limited. In addition, it is preferable that the processing blocks have the same size in the vertical and horizontal directions. For example, 128×128, 256×256, 512×512, 1024×1024, 2048×2048 or the like may be used as examples of the size of the processing blocks.

It should be noted that the actual size of the processing blocks may be equal to or larger than 2 mm and equal to or smaller than 50 mm.

As described above, the processing according to the embodiments of the present disclosure (for example, the process 520 for extracting the structure-including regions and the moiré prediction process 530) is performed for each processing block. Further, in an embodiment, the processing performed for each processing block may be performed not only for each processing block but also for overlapping regions 1430 that have the same size as the processing blocks and that overlap a plurality of adjacent processing blocks. For example, as illustrated in FIG. 14, the overlapping region 1430 may be a region shifted by half of a processing block.

Thus, in addition to the processing with respect to the processing blocks, when an overlapping region 1430 is formed so as to straddle a plurality of adjacent processing blocks, although the amount of processing increases, it is possible to increase the accuracy of predicting moiré in those portions that straddle processing blocks.

By using processing blocks 1415 that have a fixed size as illustrated in FIG. 14, it is possible to increase the calculation speed, and it is possible to reduce the memory of the processing and increase the cache hit rate. In addition, by using overlapping regions 1430 that straddle a plurality of adjacent processing blocks, it is possible to reduce the difference between the periodic structures that cross processing block boundaries and the periodic structures within processing blocks.

Further, the processing blocks 1415 illustrated in FIG. 14 may be divided into smaller sub-blocks 1445. These sub-blocks 1445 may be, for example, half the size of the processing blocks 1415 or a quarter of the size of the processing blocks 1415. In addition, since these sub-blocks 1445 can reuse the results of the sub-blocks for which calculation has already been performed in the calculation of the Fourier transform of the overlapping regions 1430, processing efficiency can be increased.

As described above, by using sub-blocks to provide overlapping regions that overlap processing blocks, it is possible to improve the determination accuracy of periodic structures that induce moiré.

Although the embodiments of the present disclosure have been described above, the present disclosure is not limited to the above-described embodiments, and various modifications can be made without departing from the spirit of the present disclosure.

While the best mode for carrying out the present invention has been described above with reference to the accompanying drawings, the scope of the present disclosure is not limited to the embodiments shown and described, and may include all embodiments that provide equivalent effects to those intended by the present invention. Furthermore, the scope of the present disclosure is not limited to the features defined by the claims, but includes all of the respective disclosed features and any combination of those features.

As used herein, the terms "unit," "system," and "network" are physical entities. These physical entities can include electrical circuits, associated devices, or the wired/wireless connections between them. These may have specific functions. These combinations having specific functions can exhibit synergistic effects by the combination of their respective functions.

The terms used within the present disclosure and particularly the appended claims (that is, the text of the appended claims) are generally intended as "open-ended" terms (that is, the term "having" should be interpreted as "having at least" and the term "including" should be interpreted as "including, but not limited to," for instance).

In addition, when interpreting terms, configurations, features, aspects, and embodiments, the drawings should be referred to as needed. Matters that can be derived directly and unambiguously from the drawings may be the basis for amendments, equivalent to text.

Furthermore, where a particular number of introduced claims are intended, such intent is explicitly recited in the claims, and where such intent is not so recited, there is no such intent. For example, to aid in understanding, the following appended claims may include use of the introductory phrases "at least one" and "one or more" to introduce claim recitations. However, the use of such phrases should not be construed as a limitation of the introduction of a claim by the indefinite article "a" or "an" to an embodiment that includes only one such claim. The phrase "one or more" or "at least one" and indefinite articles such as "a" or "an" (for example, "a" and/or "an") should be construed to mean at least "at least," "one," or "one or more." The same applies to the use of explicit articles used to introduce the description of the claims.

REFERENCE SIGNS LIST

200: Occurrence prediction system
205: Client terminal
210: Printing unit
225: Communication network
230: Moiré occurrence prediction device
231: Communication unit
232: Preprocessing unit
233: Periodic structure inclusion determination unit
234: Moiré prediction unit
235: Rection extraction unit
236: Moiré suppression unit
240: Storage unit
241: Original image
242: Half-tone image

The invention claimed is:

1. A moiré occurrence prediction method comprising:
receiving an original image;
converting the original image into a halftone dot image;
dividing the original image and/or the halftone dot image into fixed-size processing blocks;
with respect to the original image, performing a first color conversion process to convert to a first predetermined color space, performing a first contour component extraction process for extracting a first contour component, performing a first smoothing process, normalizing a maximum and a minimum value of pixels; and determining, for each of a fixed-sized processing blocks, by performing the predetermined frequency analysis process, a periodic structure region that includes a periodic structure that induces occurrence of a moiré based on either a frequency peak, a frequency peak intensity, or an intensity distribution of the original image;
with respect to the original image, performing a second color conversion process to convert to a second predetermined color space; performing a second contour component extraction process for extracting a second contour component; performing a second smoothing process; and with respect to the halftone dot image, performing a third color conversion process to convert to a third predetermined color space, performing a third resolution conversion process for aligning to a resolution of the original image, performing a third smoothing process, and subsequently generating a difference extraction image that indicates a pixel difference between the original image and the halftone dot image;
determining, by performing the predetermined frequency analysis process with respect to the difference extraction image, a degree of risk of moiré occurrence based on either a frequency peak, a frequency peak intensity, or an intensity distribution of the difference extraction image, and generating a moiré occurrence notification that indicates the degree of risk for each of the fixed-sized processing blocks processing block;
with respect to the original image, performing a fourth color conversion process to convert to a fourth predetermined color space, and generating an element similarity map illustrating similar regions having similar pixel values; and
generating, by performing a predetermined moiré suppression process with respect to each similar region in the halftone dot image based on the moiré occurrence notification, a moiré suppressed image, which has a suppressed moiré occurrence compared to the original image, and printing the moiré suppressed image.

2. A moiré occurrence prediction method comprising:
receiving an input image;
determining, in the input image; at least one periodic structure region that includes a periodic structure that induces occurrence of a moiré;
determining a degree of risk of moiré occurrence in each of the at least one periodic structure region by performing a first predetermined frequency analysis process with respect to each of the at least one periodic structure region,
generating a moiré occurrence notification that indicates the degree of risk for each periodic structure region,
generating based on the moiré occurrence notification, a moiré suppressed image, which has a suppressed moiré occurrence compared to the original image, and printing the moiré suppressed image.

3. The moiré occurrence prediction method according to claim 2, wherein:
the input image includes an original image in a vector data format and a halftone dot image in a raster data format.

4. The moiré occurrence prediction method according to claim 3, further dividing the input image into fixed-size processing blocks.

5. The moiré occurrence prediction method according to claim 4, wherein said determining in the input image; the at least one periodic structure region comprises, with respect to the original image,
performing a first color conversion process to convert to a first predetermined color space;
performing a first contour component extraction process for extracting a first contour component;
performing a first smoothing process;
normalizing a maximum and a minimum value of pixels; and
determining, for each of the fixed-sized processing blocks, by performing the first predetermined frequency analysis process, the at least one periodic structure region that includes the periodic structure that induces occurrence of the moiré based on either a frequency peak, a frequency peak intensity, or an intensity distribution of the original image.

6. The moiré occurrence prediction method according to claim 5, wherein:
said determining the degree of risk of moiré occurrence comprises, with respect to the original image,
performing a second color conversion process to convert to a second predetermined color space;
performing a second contour component extraction process for extracting a second contour component;
performing a second smoothing process; and
with respect to the halftone dot image,
performing a third color conversion process to convert to a third predetermined color space;
performing a resolution conversion process for aligning to a resolution of the original image;
performing a third smoothing process;
subsequently generating a difference extraction image that indicates a pixel difference between the original image and the halftone dot image;
determining, by performing a second predetermined frequency analysis process with respect to the difference extraction image, a degree of risk of moiré occurrence based on either a frequency peak, a frequency peak intensity, or an intensity distribution of the difference extraction image; and
generating the moiré occurrence notification that indicates the degree of risk for each of the fixed-sized processing blocks.

7. The moiré occurrence prediction method according to claim 6, wherein:
determining in the input image; the periodic structure region and said determining the degree of risk of moiré occurrence comprise performing processing with respect to overlapping regions that overlap a plurality of adjacent processing blocks.

8. The moiré occurrence prediction method according to claim 7, further comprising extracting a region to be subjected to moiré suppression processing, wherein:
said extracting comprises, with respect to the original image,
performing a fourth color conversion process to convert to a fourth predetermined color space; and
generating an element similarity map illustrating similar regions having similar pixel values.

9. The moiré occurrence prediction method according to claim 8, wherein said generating the moiré suppressed image comprises performing a predetermined moiré suppression process with respect to each similar region in the halftone dot image based on the moiré occurrence notification.

10. The moiré occurrence prediction method according to claim 2, wherein said receiving the input image comprises receiving the input image from a client terminal via a communication network.

11. A computer system comprising:
a memory; and
a processor operatively coupled to the memory, the processor is configured to receive an input image;
determine, in the input image, at least one periodic structure region that includes a periodic structure that induces occurrence of a moiré;
determine a degree of risk of moiré occurrence in each of the at least one periodic structure region by performing a predetermined frequency analysis process with respect to each of the at least one determined periodic structure region,
generate a moiré occurrence notification that indicates a degree of risk for each of the at least one periodic structure region,
generate based on the moiré occurrence notification, a moiré suppressed image, which has a suppressed moiré occurrence compared to the original image, and printing the moiré suppressed image.

* * * * *